(12) United States Patent
Yang et al.

(10) Patent No.: US 12,313,945 B2
(45) Date of Patent: May 27, 2025

(54) ELECTRONIC DEVICE

(71) Applicant: InnoLux Corporation, Miao-Li County (TW)

(72) Inventors: Tsung-Yu Yang, Miao-Li County (TW); Ming-Huang Chen, Miao-Li County (TW); Shu-Fen Li, Miao-Li County (TW); Chuan-Chi Chien, Miao-Li County (TW); I-An Yao, Miao-Li County (TW); Jui-Chu Lai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 58 days.

(21) Appl. No.: 18/169,243

(22) Filed: Feb. 15, 2023

(65) Prior Publication Data

US 2023/0296944 A1    Sep. 21, 2023

Related U.S. Application Data

(60) Provisional application No. 63/320,749, filed on Mar. 17, 2022.

(30) Foreign Application Priority Data

Dec. 19, 2022    (CN) .......................... 202211633810.1

(51) Int. Cl.
    *G02F 1/1345*    (2006.01)
    *G02F 1/1339*    (2006.01)
    *G02F 1/1343*    (2006.01)

(52) U.S. Cl.
    CPC ...... *G02F 1/13452* (2013.01); *G02F 1/13394* (2013.01); *G02F 1/13398* (2021.01); *G02F 1/134336* (2013.01)

(58) Field of Classification Search
    CPC ............... G02F 1/1339; G02F 1/13392; G02F 1/13394; G02F 1/13398; G02F 1/13452; G02F 1/134394
    See application file for complete search history.

(56) References Cited

U.S. PATENT DOCUMENTS

2003/0231276 A1* 12/2003 Miki ...................... G02F 1/1339
                                                                 349/122

FOREIGN PATENT DOCUMENTS

CN            101424827 A      5/2009

* cited by examiner

*Primary Examiner* — Angela M. Medich
(74) *Attorney, Agent, or Firm* — McClure, Qualey & Rodack, LLP

(57) ABSTRACT

An electronic device including a panel is provided. The panel includes a first substrate, a second substrate opposite to the first substrate, a medium layer disposed between the first substrate and the second substrate, a sealant disposed between the first substrate and the second substrate and surrounding the medium layer, a plurality of first electrodes disposed between the first substrate and the medium layer, and a plurality of connecting lines disposed between the second substrate and the first electrodes. The sealant includes a plurality of conductive particles. The first electrodes are electrically connected to the connection lines through the conductive particles. There is a first space S1 between two adjacent connecting lines of the connecting lines. One of the conductive particles has a width of W. The first space S1 and the width W conform to the following formula: 3≤S1/W≤20.

9 Claims, 18 Drawing Sheets

ELECTRONIC DEVICE

CROSS REFERENCE TO RELATED APPLICATIONS

This Application claims the benefit of U.S. Provisional Application No. 63/320,749, filed on Mar. 17, 2022, and priority of China Patent Application No. 202211633810.1, filed on Dec. 19, 2022, the entirety of which are incorporated by reference herein.

BACKGROUND OF THE INVENTION

Field of the Invention

The present disclosure relates to an electronic device, and in particular, to an electronic device comprising conductive particles or conductive spacers.

Description of the Related Art

An electronic device is driven by signals provided by electronic components to operate the electronic device. In order to meet requirements for providing the driving signals, the electronic components need to be bonded to a substrate and/or a circuit board of the electronic device. With the development of a semiconductor industry, reducing the procedure of the bonding process for the electronic device or using the substrate space more efficiently is an important issue.

BRIEF SUMMARY OF THE INVENTION

An embodiment of the present disclosure provides an electronic device comprising a panel. The panel comprises a first substrate, a second substrate opposite to the first substrate, a medium layer disposed between the first substrate and the second substrate, a sealant disposed between the first substrate and the second substrate and surrounding the medium layer, a plurality of first electrodes disposed between the first substrate and the medium layer, and a plurality of connecting lines disposed between the second substrate and the plurality of first electrodes. The sealant comprises a plurality of conductive particles. The plurality of first electrodes are electrically connected to the plurality of connecting lines via the plurality of conductive particles. A first space S1 is between two adjacent connecting lines among the plurality of connecting lines. One of the plurality of conductive particles has a width of W, and the first space S1 and the width W conform to the following formula: $3 \leq S1/W \leq 20$.

An embodiment of the present disclosure provides an electronic device comprising a panel. The panel comprises a first substrate, a second substrate opposite to the first substrate, a medium layer disposed between the first substrate and the second substrate, a plurality of first electrodes disposed between the first substrate and the medium layer, a plurality of connecting lines disposed between the second substrate and the plurality of first electrodes, and at least one conductive spacer. The first electrodes comprise a connecting first electrode and an adjacent first electrode. The connecting lines comprise a first connecting line and a second connecting line. The at least one conductive spacer is electrically connected to the connecting first electrode and the first connecting line. The second connecting line is adjacent to the first connecting line. The at least one conductive spacer is separated from the second connecting line by a third space S3. The third space S3 is greater than or equal to 3 μm and less than or equal to 50 μm.

An embodiment of the present disclosure provides an electronic device comprising a panel. The panel comprises a first substrate, a second substrate opposite to the first substrate, a medium layer disposed between the first substrate and the second substrate, a plurality of first electrodes disposed between the first substrate and the medium layer, a plurality of conductive connecting lines disposed between the second substrate and the first electrodes, and at least one conductive spacer. The first electrodes comprise a connecting first electrode and an adjacent first electrode. The conductive spacer is electrically connected to the connecting first electrode and one of the conductive connecting lines. The conductive spacer is separated from the adjacent first electrode by a fifth space S5. The fifth space S5 is greater than or equal to 3 μm and less than or equal to 50 μm.

BRIEF DESCRIPTION OF THE DRAWINGS

The present disclosure can be more fully understood by reading the subsequent detailed description and examples with references made to the accompanying drawings.

DETAILED DESCRIPTION OF THE INVENTION

Figure 1:
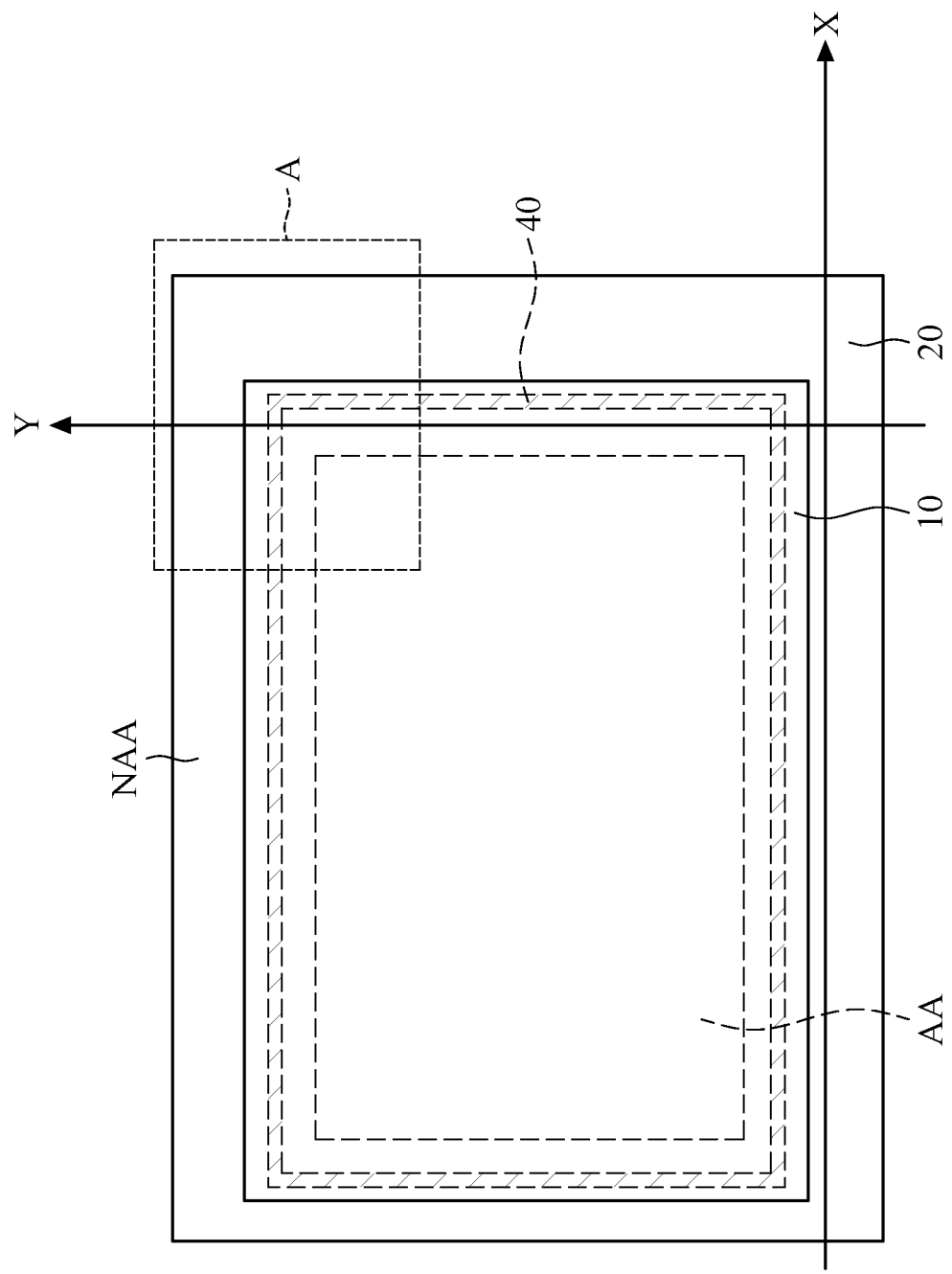
FIG. 1 is a top schematic view of an electronic device according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

It will be understood that some terms are used to refer to specific components throughout the specification and the following claims of this disclosure. It should be understood by those of skill in the art that the same components may be referred to by different names. It is not intended herein to distinguish between components that are functionally identical but have different names. In the specification and claims below, the terms "comprise" and "include" are open-ended terms and should be interpreted to mean "contains but not limited to . . . ".

The use of ordinal terms such as "first", "second", etc., in the specification and the claims to modify an component does not by itself connote any precedence, or order of one claim element over another or the temporal order in which it is formed, but are used merely as labels to distinguish one claim component having a certain name from another component having the same name. Therefore, the first component in the specification may be referred to by the second component in the claims.

Directional terms, such as "above," "below," "left," "right", "front", "back", and the like, only with reference to the direction of the accompanying drawings. Therefore, the directional terms used herein are for illustrative purposes and are not intended to limit the present disclosure. It is important to understand that in order to specifically describe or illustrate the components, directional terms may be presented in various forms that may be known to those of skill in the art. Herein, when a component is referred to as "overlapping" with another component, it should be understood that the component overlaps the other component partly or completely.

Furthermore, a description of a component or layer over or connected to another component or layer may comprise embodiments in which the component or layer is directly over the other component or layer, or the component or layer is directly connected to the other component or layer. It may also comprise embodiments in which inserted components are between the component or layer and the other component or layer (indirectly). On the contrary, the description of a component or layer directly over or directly connected to another component or layer indicates that there are no inserted components between the component or layer and the other component or layer. Herein, a description of a component coupled to another component may comprise embodiments in which other components are between the component and the other component to electrically connect the component and the other component; and may also comprise embodiments in which the component is directly electrically connected to the other component without any further components. On the contrary, the description of a component directly coupled to another component indicates that the component is directly electrically connected to the other component without any other components.

Herein, the term "about", "substantially" indicates a value of a given value or range that varies within 10%, or within 5%, or within 3%, or within 2%, or within 1%, or within 0.5%. The value given here is an approximate value, i.e., "about", or "substantially", may be implied without specifying "about", or "approximate".

Unless otherwise defined, all terms (including technical and scientific terms) used herein have the same meaning as commonly understood by a person skilled in the art to which the disclosure pertains. It will be further understood that terms, such as those defined in commonly used dictionaries, should be interpreted as having a meaning consistent with the relevant technology and the context or background of this disclosure and will not be interpreted in an idealized or overly formal sense unless expressly so defined herein.

The electronic device of the present disclosure may include a display device, an antenna device, or a sensing device, a touch electronic device (touch display), an encapsulation device, a curved surface electronic device (curved display) or a non-rectangular electronic device (free shape display), but it is not limited thereto. The electronic device may be a bendable electronic device or a flexible electronic device, but the present disclosure is not limited there to. The antenna device maybe, for example, a liquid crystal antenna, but it is not limited thereto. The antenna device may comprise, for example, an antenna splicing device, but is not limited thereto. The encapsulation device may be an encapsulation device for Wafer-Level Package (WLP) technology or Panel-Level Package (WLP) technology, such as chip first process or RDL first process. It should be noted that the electronic device can be but not limited to any combination of the aforementioned devices. In addition, a shape of the electronic device may be a rectangle, a circle, a polygon, a shape with curved edges, or other suitable shape. The electronic device may comprise electronic components. The electronic components may comprise passive components and active components, such as capacitors, resistors, inductors, diodes, transistors, etc. The diodes may comprise light-emitting diodes or photodiodes. The light-emitting diodes may comprise, for example, organic light-emitting diodes (OLED), mini light-emitting diodes (mini-LED), micro light-emitting diodes (micro-LED) or quantum dot light-emitting diodes (quantum dot LED), but it is not limited thereto. The electronic device may have peripheral systems, such as a drive system, control system, light source system, shelf system and the likes for supporting the display device, the antenna device, or the splicing device.

Figure 2:
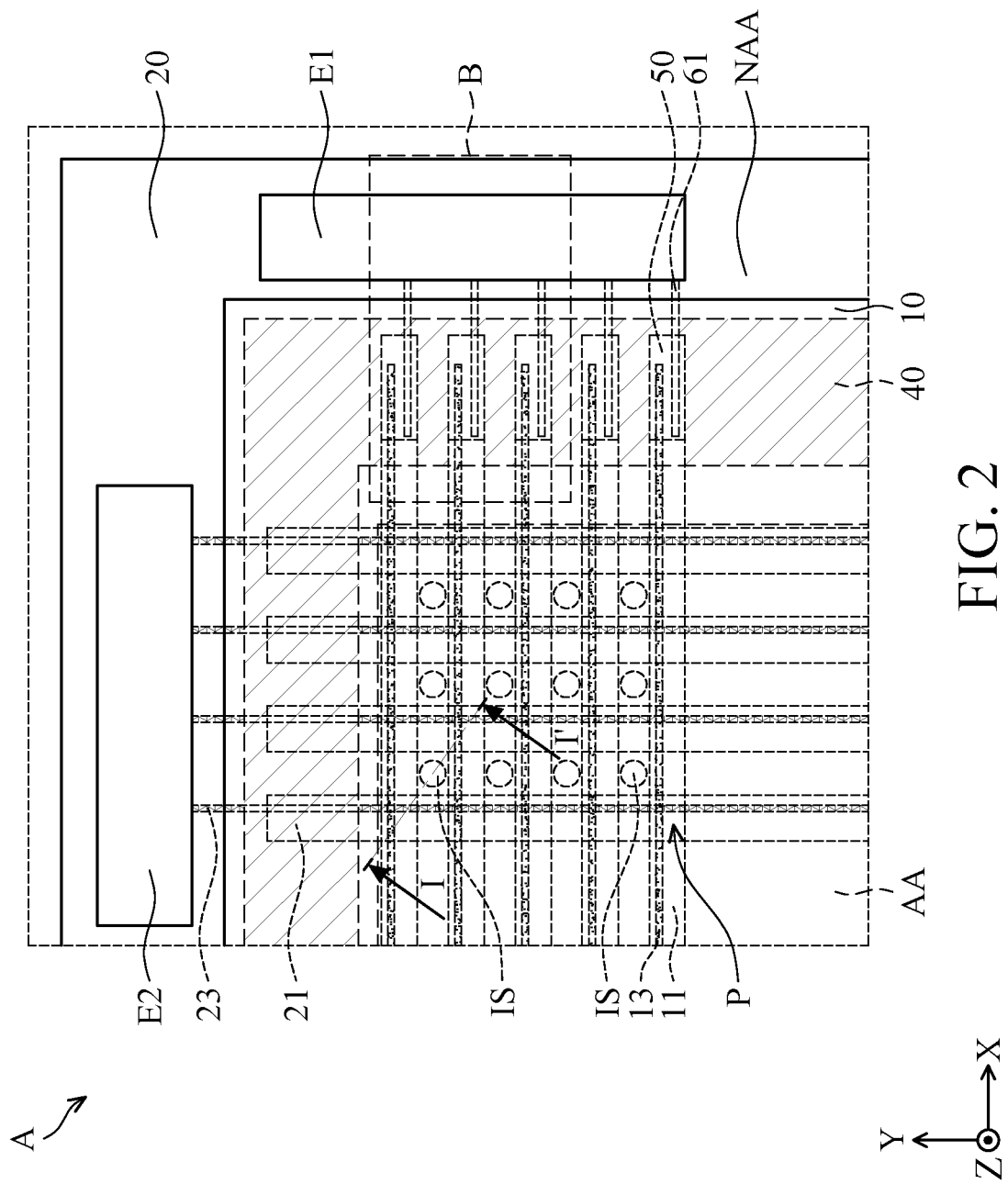
FIG. 2 is an enlarged schematic view of a region A in a panel of the electronic device of FIG. 1, according to an embodiment of the present disclosure.
Figure 3:
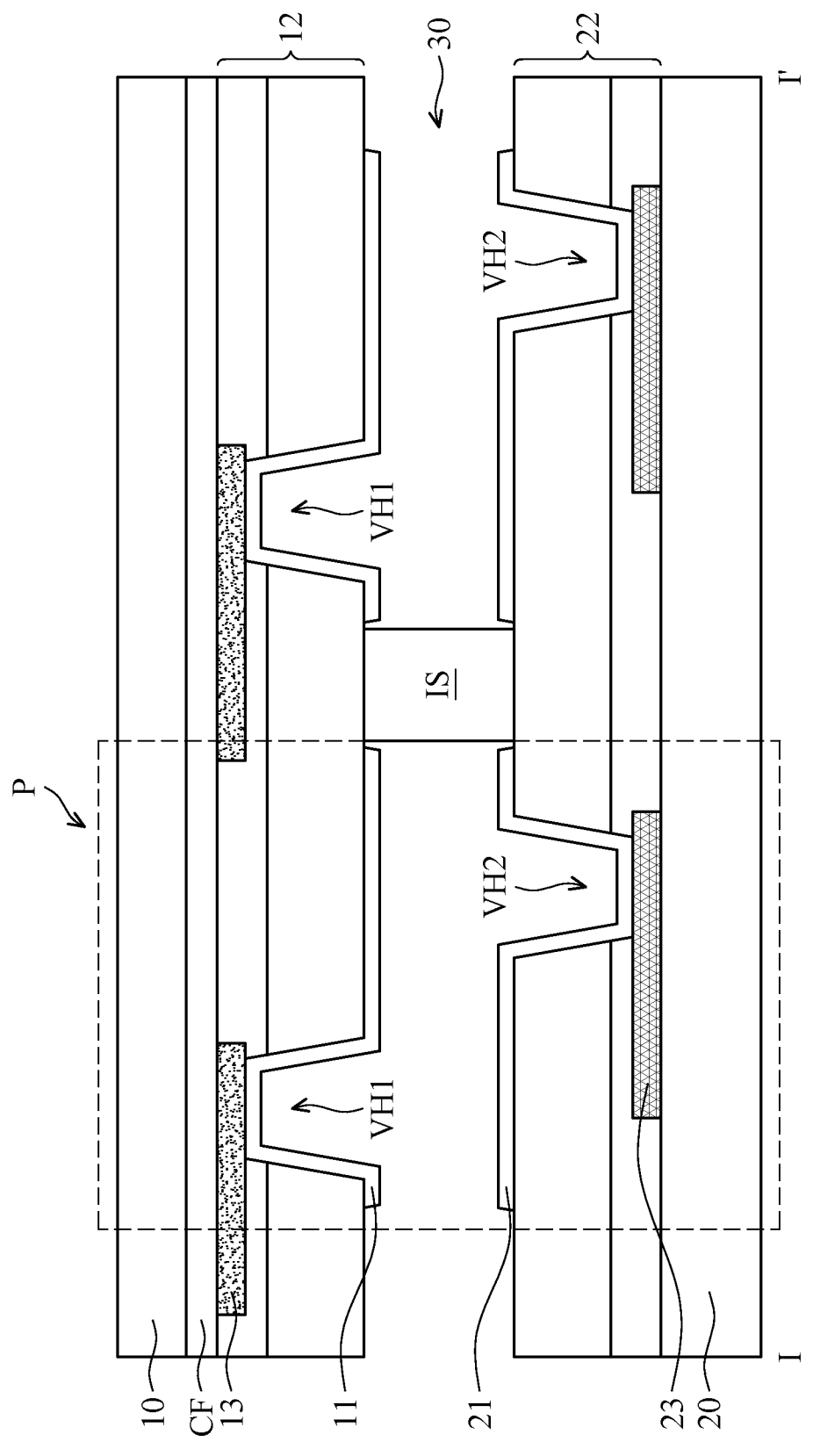
FIG. 3 is a cross-section schematic view of the panel of FIG. 2 taken along line I-I', according to an embodiment of the present disclosure.
Figure 4:
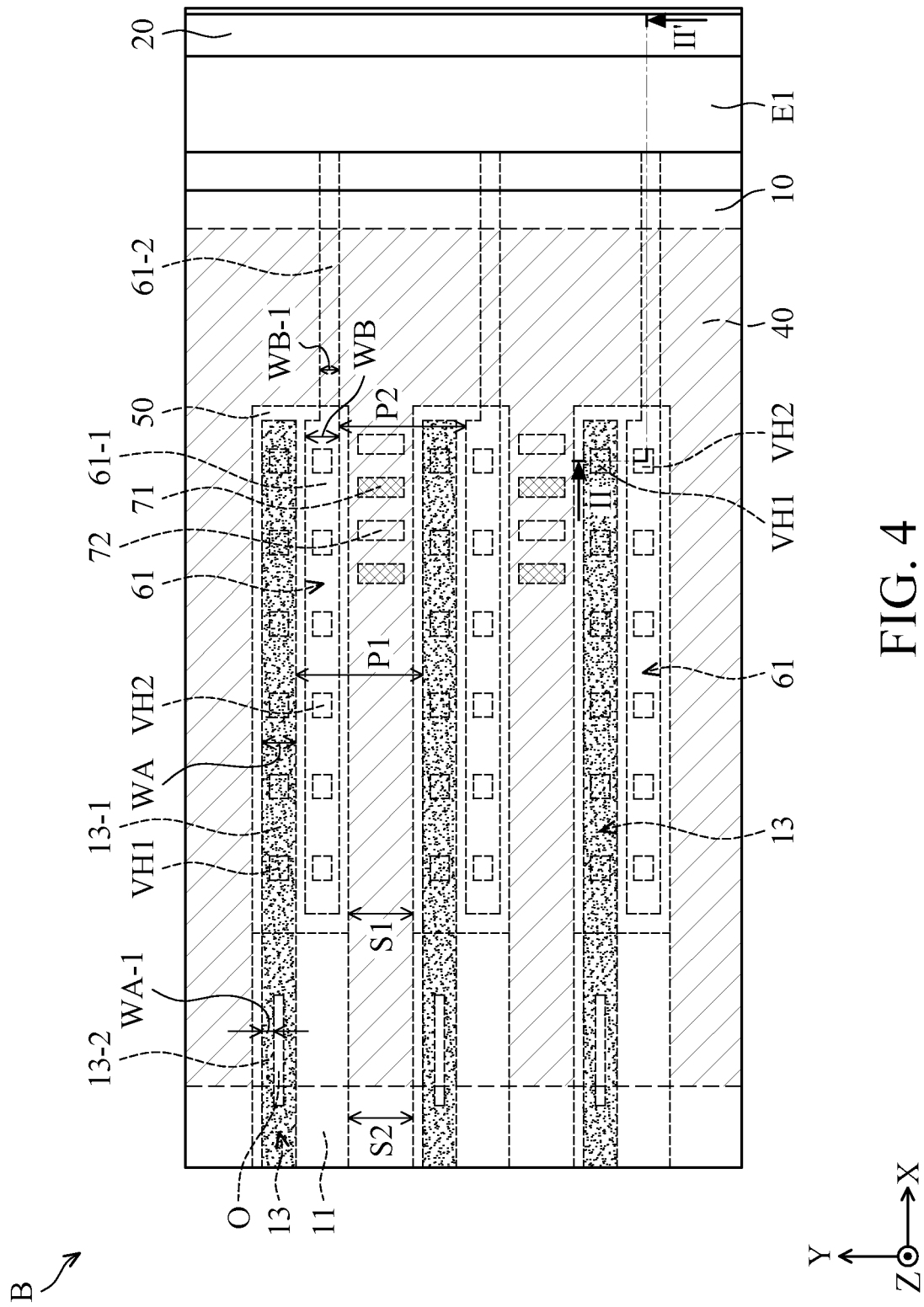
FIG. 4 is an enlarged schematic view of a region B in FIG. 2, according to an embodiment of the present disclosure.

An embodiment of the present disclosure provides an electronic device. FIG. 1 is a top schematic view of an electronic device according to an embodiment of the present disclosure. FIG. 2 is an enlarged schematic view of a region A in a panel 1 (refer to FIGS. 17 and/or 18) of the electronic device of FIG. 1, according to an embodiment of the present disclosure. FIG. 3 is a cross-section schematic view of the panel 1 of the electronic device taken along line I-I' in FIG. 2, according to an embodiment of the present disclosure. FIG. 4 is an enlarged schematic view of a region B in FIG. 2, according to an embodiment of the present disclosure.

Figure 5:
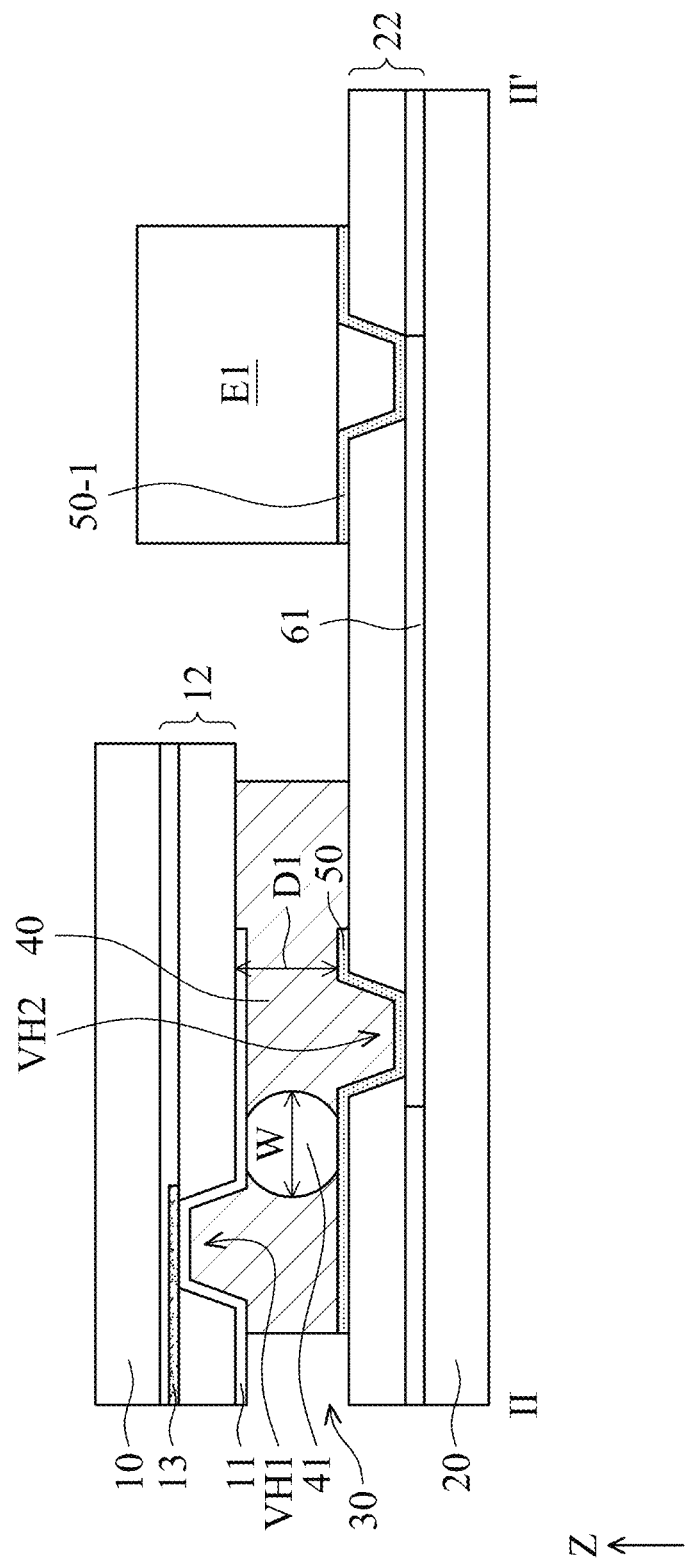
FIG. 5 is a cross-section schematic view of a panel of an electronic device taken along line II-II' in FIG. 4, according to an embodiment of the present disclosure.

FIG. 5 is a cross-section schematic view of the panel 1 of the electronic device taken along line II-II' in FIG. 4, according to an embodiment of the present disclosure. The structure of the panel 1 of the electronic device of an embodiment of the present disclosure is described in detail below in conjunction with FIGS. 1 to 5.

As shown in FIG. 1, the panel 1 comprises an active area AA and a non-active area NAA. The non-active area NAA is adjacent to at least one side of the active area AA or surrounds the active area AA. Referring to FIGS. 1 to 5, the panel 1 comprises a first substrate 10, a second substrate 20, a sealant 40, a medium layer 30, a plurality of first electrodes 11, a plurality of second electrodes 21, a plurality of connecting lines 50, a plurality of first transmission lines 61, spacers IS (such as insulation spacer), an electronic component E1 and an electronic component E2, but it is not limited thereto. In some embodiments, one of the electronic component E1 and the electronic component E2 is, for example, a scan driving circuit, and another of the electronic component E1 and electronic component E2 is, for example, a data driving circuit, but it is not limited thereto.

In some embodiments, the panel 1 comprises the first substrate 10 and the second substrate 20. The second substrate 20 is opposite to the first substrate 10. In some embodiments, a plurality of spacers IS are, for example, disposed between the first substrate 10 and the second substrate 20, so that the first substrate 10 and the second substrate 20 are separated by a distance, as shown in FIG. 3. In some embodiments, the first substrate 10 and/or the second substrate 20 may comprise a flexible substrate, a rigid substrate, or a combination thereof, but it is not limited thereto. In some embodiments, the first substrate 10 and/or the second substrate 20 may comprise a transparent substrate, a semi-transparent substrate or an opaque substrate. According to some embodiments, the material of the first substrate 10 and/or the second substrate 20 may comprise glasses, quartz, sapphires, ceramics, polyimides (PI), polycarbonates (PC), polyethylene terephthalates (PET), polypropylenes (PP), stainless steels, alloy steels, carbon fibers, glass fibers, other suitable materials, or any combination thereof, but it is not limited thereto. In some embodiments, the spacer IS may comprise photoresist materials or organic materials, but it is not limited thereto.

In some embodiments, the medium layer 30 is disposed between the first substrate 10 and the second substrate 20. The sealant 40 is disposed between the first substrate 10 and the second substrate 20 and surrounds the medium layer 30. In some embodiments, the sealant 40 surrounds the medium layer 30 along the edge of the first substrate 10 or the second substrate 20. In a normal direction Z of the first substrate 10, the sealant 40 has, for example, a ring shape, as shown in FIG. 1.

In some embodiments, as shown in FIG. 4, the region of the first substrate 10 that corresponds to (or overlaps) the sealant 40 may have, for example, at least one first trench 71, but it is not limited thereto. The first trench 71 may be, for example, a trench formed from the first substrate 10 itself, or a trench formed from other stacked layers disposed in the first substrate 10. In some embodiments, the region of the second substrate 20 that corresponds to (or overlaps) the sealant 40 may have, for example, at least one second trench 72, but it is not limited thereto. The second trench 72 may be, for example, a trench formed from the second substrate 20 itself, or a trench formed from other stacked layers disposed in the second substrate 20. In some embodiments, in the normal direction Z of the first substrate 10, the first trench 71 and the second trench 72 are, for example, alternately provided. That is, when viewed from a normal direction Z of the first substrate 10, the first trench 71 and the second trench 72 do not overlap each other, as shown in FIG. 4. In some embodiments, the adhesion between the sealant 40 and the first substrate 10 and/or the second substrate 20 can be increased by the first trench 71 and/or the second trench 72. In some embodiments, the first trench 71 and/or the second trench 72 may not overlap the first electrodes 11 and/or the second electrodes 21.

In some embodiments, the sealant 40 may comprise a plurality of conductive particles 41, as shown in FIG. 5. In some embodiments, one of the plurality of conductive particles 41 may have a width W. In some embodiments, the width W of the conductive particle 41 is, for example, greater than the thickness D1 of the sealant 40, but it is not limited thereto. In some embodiments, the width W of the conductive particle 41 is, for example, a maximum width of the conductive particle 41 after pressed.

In some embodiments, a volume percentage of the conductive particles 41 in the sealant 40 is A %. That is, a sum of volumes of all the conductive particles 41 in the sealant 40/a volume of the sealant 40 (including the conductive particles 41)×100%=A %. In some embodiments, the sealant 40 may further comprise fillers (not shown). The fillers may be used to increase a structural stability and/or support strength of the sealant 40, but it is not limited thereto. The filler may have various shapes, such as a spherical shape, a rod shape, an irregular shape, or any combination thereof. In some embodiments, a maximum width of the filler is, for example, less than or equal to the width W of the conductive particle 41. Accordingly, conduction between the conductive particle 41 and the first electrode 11 and the connecting line 50 can be improved. Materials of the sealant 40 may comprise, thermosetting materials, photochemical curable materials, thermal-photo curable materials, or any combination thereof, but it is not limited thereto. In some embodiments, the materials of the sealant 40 may comprise organic resins, polyurethane resins, acrylic resins, other similar resins, or any combination thereof, but it is not limited thereto. The materials of the conductive particle 41 may comprise metals such as gold, silver, copper, tin, nickel, alloys thereof, or any combination thereof, but it is not limited thereto. Materials of the fillers may comprise glass fibers, plastics, silanols, mica, other similar fillers, other insulation materials, or any combination thereof, but it is not limited thereto.

In some embodiments, the medium layer 30 is disposed between the first substrate 10 and the second substrate 20, as shown in FIG. 3. In some embodiments, the medium layer 30 may comprise cholesteric liquid crystals (ChLCs), other liquid crystals, or a combination thereof, but it is not limited thereto.

In some embodiments, the electronic component E1 and/or the electronic component E2 are disposed, for example, above the second substrate 20 and in the non-active area NAA, as shown in FIG. 2, but it is not limited thereto. In other embodiments, the electronic component E1 and/or the electronic component E2 are disposed, for example, above the first substrate 10 and in the non-active area NAA. In some embodiments, the electronic component E1 and/or the electronic component E2 may comprise integrated circuits (ICs), flexible printed circuit boards (FPCs), chip-on-film (COF) substrates, the like, or any combination thereof, but it is not limited thereto. The electronic component E1 and the electronic component E2 may be the same as or different from each other. In some embodiments, the plurality of first electrodes 11 are disposed above the first substrate 10 and extend along X direction. The plurality of first electrodes 11 are arranged along the Y direction intersecting the X direction, as shown in FIG. 2. In some embodiments, the X direction may be perpendicular to the Y direction. The plurality of first electrodes 11 may be disposed between the first substrate 10 and the medium layer 30, as shown in FIG. 3. In some embodiments, in the normal direction Z of the first substrate 10, the sealant 40 at least partly overlaps the first electrode 11. In some embodiments, a portion of the first electrode 11 may be disposed between the first substrate 10 and the sealant 40, as shown in FIG. 5. The plurality of second electrodes 21 are disposed above the second substrate 20 and extend along the Y direction. The plurality of second electrodes 21 are arranged, for example, along the X direction, as shown in FIG. 2. In some embodiments, the second electrodes 21 are disposed between the second substrate 20 and the medium layer 30, as shown in FIG. 3. In some embodiments, in the normal direction Z of the first substrate 10, the sealant 40 at least partly overlaps the second electrode 21. In some embodiments, a portion of the second electrode 21 is disposed between the second substrate 20 and the sealant 40, as shown in FIG. 2.

In some embodiments, the first electrodes 11 and the second electrodes 21 may comprise the same or different materials. In some embodiments, the first electrodes 11 and the second electrodes 21 may comprise the same or different transparent metal oxides. For example, the first electrodes 11 and the second electrodes 21 may comprise indium tin oxide (ITO) or other suitable materials.

In some embodiments, the plurality of first electrodes 11 and the plurality of second electrodes 21 are, for example, are intersected with each other. In some embodiments, the spacers IS may be disposed in the active area AA. In some embodiments, regions where the first electrodes 11 and the second electrodes 21 overlap can be defined as the pixel area P. In some embodiments, in the normal direction Z of the first substrate 10, the spacers IS, for example, do not overlap the pixel area P. In other words, the spacer IS is disposed in a region formed by the intersecting first electrodes 11 and second electrodes 21. In particular, the spacer IS can be disposed in a region formed by crossing two adjacent first electrodes 11 with two adjacent second electrodes 21. In some embodiments, in the normal direction Z of the first substrate 10, the spacers IS may not overlap the first electrodes 11 and/or the second electrodes 21. In some embodiments, the spacers IS may not contact the first electrodes 11 and/or the second electrodes 21, but not limited thereto. Herein, the term "two adjacent first electrodes 11" means that there are no other first electrodes 11 between the two first electrodes 11. The term "two adjacent second electrodes 21" means that there are no other second electrodes 21 between the two second electrodes 21. There is a second space S2 between the two adjacent first electrodes 11. It should be noted that when a first electrode 11 is disposed between two other first electrodes 11, the first electrode 11 in the middle can be adjacent to the other two first electrodes 11 respectively. The second space S2 indicates the smaller space of the spaces between the middle first electrode 11 and the other two first electrodes 11. In some embodiments, the second space S2 and the width W conform to the following formula:

$$3 \leq S2/W \leq 20.$$

In some embodiments, the sealant 40 comprises a plurality of conductive particles in a volume percentage of A %. That is, a volume percentage of A % of the conductive particles 41, the second space S2 and the width W conform to the following formula:

$$A \times 4 \times W \leq S2.$$

In some embodiments, the plurality of connecting lines 50 are disposed between the second substrate 20 and the plurality of first electrodes 11, as shown in FIGS. 4 and 5. In some embodiments, the plurality of connecting lines 5 extend along the X direction, but it is not limited thereto. In some embodiments, the plurality of connecting lines 50 are arranged along the Y direction, as shown in FIG. 2 and FIG. 4. In some embodiments, the connecting lines 50 are electrically connected to the electronic component E1 disposed in the non-active area NAA. In some embodiments, the connecting lines 50 may comprise transparent metal oxides, such as indium tin oxide (ITO) or other suitable material, but it is not limited thereto. In some embodiments, the plurality of connecting lines 50 may be disposed between the medium layer 30 and the second substrate 20 (or the first transmission lines 61). In some embodiments, in the normal direction Z of the first substrate 10, the sealant 40 at least partly overlaps the connecting lines 50. In some embodiments, the connecting lines 50 are disposed between the first transmission line 61 and the first electrodes 11. In some embodiments, the sealant 40 is disposed between the first electrodes 11 and the connecting lines 50. The plurality of first electrodes 11 are electrically connected to the plurality of connecting lines 50 via the plurality of conductive particles 41 in the sealant 40, as shown in FIG. 5. In some embodiments, two adjacent connecting lines 50 of the plurality of connecting lines 50 have a first space S1 therebetween, as shown in FIG. 4. Herein, the meaning of the term "adjacent" is similar to that used for modifying the first electrodes 11 and/or second electrodes 21. Therefore, the explanation of the term "adjacent" is not repeated herein. When a connecting line 50 is disposed between two connecting lines 50, the connecting line 50 in the middle can be adjacent to the other two connecting lines 50 respectively. The first space S1 indicates the smaller space of the spaces between the middle connecting line 50 and the other two connecting lines 50. In some embodiments, the first space S1 and the width W conform to the following formula:

$$3 \leq S1/W \leq 20.$$

In some embodiments, the sealant 40 comprises the plurality of conductive particles in a volume percentage of A %. That is, a volume percentage of the conductive particles 41 is A %. In some embodiments, the second space S1 and the width W conform to the following formula:

$$A \times 4 \times W \leq S1.$$

As shown in FIG. 4, the plurality of first transmission lines 61 are disposed above the second substrate 20 and extend along the X direction. The plurality of first transmission lines 61 are arranged along the Y direction, as shown in FIG. 2 and FIG. 4. The first transmission line 61 is electrically connected to the electronic component E1. In particular, the first transmission line 61 can be electrically connected to the electronic component E1 via another connecting line 50-1, but it is not limited thereto. In some embodiments, the connecting line 50 and the other connecting line 50-1 may be material layers comprising the same material, but it is not limited thereto. In some embodiments, the connecting line 50 comprises, for example, the same material layer as a second conductive line 23, but it is not limited thereto. In some embodiments, a portion of the first transmission line 61 can be disposed between the sealant 40 (or the connecting line 50) and the second substrate 20. In some embodiments, as shown in FIG. 3, the panel 1 may comprise a second insulation layer 22 disposed above the second substrate 20 and between the second substrate 20 and the second electrodes 21. In some embodiments, as shown in FIG. 3, the second insulation layer 22 may be disposed between the second electrodes 21 and the second conductive line 23 (described later). The second insulation layer 22 may comprise a single-layer or multi-layer structure. In some embodiments, as shown in FIG. 5, the second insulation layer 22 may be disposed between the second substrate 20 and the connecting line 50 or the other connecting line 50-1. In some embodiments, as shown in FIG. 5, the second insulation layer 22 may be disposed between the connecting line 50 (and/or the other connecting line 50-1) and the first transmission line 61. In some embodiments, as shown in FIG. 3 to FIG. 5, the second insulation layer 22 may have a plurality of second vias VH2. In some embodiments, as shown in FIG. 3, the second electrode 21 may be electrically connected or contacted with the second conductive line 23 through the second via VH2, for example. In some embodiments, as shown in FIGS. 4-5, the connecting line 50 (and/or the other connecting line 50-1) may be electrically connected or contacted with the first transmission line 61 through the second via VH2, for example.

In some embodiments, as shown in FIG. 4, the first transmission line 61 may comprise a first portion 61-1 and a second portion 61-2. The second portion 61-2 is connected to the first portion 61-1, and the second portion 61-2, for example, is closer to the electronic component E1 than the first portion 61-1. In some embodiments, the first portion 61-1, for example, overlaps the plurality of second vias VH2. In some embodiments, in the normal direction Z of the first substrate 10, the first portion 61-1, for example, overlaps the sealant 40. In some embodiments, the first portion 61-1 has a line width WB. In some embodiments, the line width WB may be in a range of 1 µm to 40 µm (1 µm≤WB≤40 µm). If the line width WB is too large (i.e. greater than 41 µm), the sealant 40 may be difficult to cure. The term "line width" used herein indicates a maximum length measured in a direction perpendicular to the extension direction of the first transmission line 61. In some embodiments, a line width WB-1 of the second portion 61-2 may be smaller than the line width WB of the first portion 61-1.

In some embodiments, there is a second interval P2 between two adjacent first transmission lines 61. The smallest space between the two adjacent first transmission lines 61 is defined as the second interval P2. Herein, the meaning of the term "adjacent" is similar to that used for modifying the first electrodes 11 and/or second electrodes 21. Therefore, the explanation of the term "adjacent" is not repeated herein. When a first transmission line 61 is disposed between two first transmission lines 61, the first transmission line 61 in the middle can be adjacent to the other two first transmission lines 61 respectively. The second interval P2 indicates the smaller interval of the intervals between the middle first transmission line 61 and the other two first transmission lines 61. In some embodiments, the line width WB of the first portion 61-1 and the second interval P2 conform to the following formula:

$WB/P2 \leq 30\%$.

In some embodiments, the resistance of the first transmission line 61 may be less than or equal to the resistance of the connecting line 50, but it is not limited thereto. In some embodiments, the first transmission line 61 may comprise metals, such as aluminum, molybdenum, titanium, gold, silver, copper, tin, nickel, alloys thereof, or any combination thereof, but it is not limited thereto.

In some embodiments, as shown in FIG. 3, the panel 1 may comprise a first insulation layer 12 and a first conductive line 13 disposed between the first substrate 10 and the second substrate 20. In some embodiments, the first insulation layer 12 may comprise a single-layer or multi-layer structure. The first insulation layer 12 and the second insulation layer 22 may comprise the same or different materials. In some embodiments, the first insulation layer 12 may be disposed between the first substrate 10 and the first electrodes 11, and the first conductive line 13 may be disposed between the first substrate 10 and the first insulation layer 12. A plurality of first conductive lines 13 extends, for example, along the X direction. The first electrodes 11 are arranged, for example, along the Y direction, as shown in FIG. 2. The first insulation layer 12 comprises a plurality of first vias VH1. The first electrodes 11 may be electrically connected or contacted with the first conductive lines 13 through the first vias VH1, as shown in FIG. 5 or FIG. 3. In some embodiments, the resistance of the first conductive line 13 may be less than or equal to the resistance of the first electrodes 11 to reduce an impedance of the panel 1. In some embodiments, the first conductive lines 13 may comprise metals. For example, the first conductive lines 13 may comprise aluminum, molybdenum, titanium, gold, silver, copper, tin, nickel, alloys thereof, or any combination thereof, but it is not limited thereto. The first insulation layer 12 may comprise oxides, such as silicon oxide; nitrides, such as silicon nitride; fluorides, such as tetrafluoroethylene, perfluorovinyl ether, or polymers thereof, such as fluoroplastics (PFA) or any combination thereof. In some embodiments, as shown in FIG. 3, an optical layer CF may be optionally disposed between the first substrate 10 and the first insulation layer 12. The optical layer CF comprises, for example, a filter layer or other light-scattering material layers, but it is not limited thereto. In some embodiments, other insulation layers (such as organic materials or inorganic layers) can be optionally disposed between the optical layer CF and the first insulation layer 12.

As shown in FIG. 4 and FIG. 5, in some embodiments, the sealant 40 at least partly overlaps the first conductive lines 13, the first electrodes 11, the connecting lines 50 and/or the first transmission line 61. As shown in FIG. 4, in some embodiments, the first conductive line 13 comprises a first portion 13-1 and a second portion 13-2 connected to the first portion 13-1. The second portion 13-2 is, for example, closer to the active area AA than the first portion 13-1 (further away from the electronic component E1). In some embodiments, the first portion 13-1 and/or the second portion 13-2 of the first conductive lines 13 overlap the sealant 40. In some embodiments, the first portion 13-1 of the first conductive line 13 has a line width WA, and the line width WA of the first portion 13-1 of the first conductive line 13 may be the same as or different from the line width WB of the first portion 16-1 of the first transmission line 61. In some embodiments, the second portion 13-2 has an opening O, and the opening O may overlap the sealant 40. The effect of the curing of the sealant 40 can be improved by the opening O. The interface between the first portion 13-1 and the second portion 13-2 can be divided by the opening O. For example, the second portion 13-2 may be defined as the portion containing the opening O. The line width WA of the first portion 13-1 may be less than 40 µm. For example, the line width WA is between 1 µm and 39 µm (1 µm≤line width WA≤39 µm), but it is not limited thereto. If the line width WA is too large (i.e. greater than 40 µm), the sealant 40 may be difficult to cure. The line width WA-1 of the portion of the second portion 13-2 that corresponds to the opening O may be less than 20 µm. For example, the line width WA-1 may be between 1 µm and 19 µm (1 µm≤line width WA-1≤19 µm), but it is not limited thereto. The "line width" of a component used herein indicates, for example, a maximum width of the component which is measured along a direction perpendicular to the extending direction of the component.

In some embodiments, there is a first interval P1 between two adjacent first conductive lines 13. The smallest space between the two adjacent first conductive lines 13 is defined as the first interval P1. Herein, the meaning of the term "adjacent" is similar to that used for modifying the first electrodes 11 and/or second electrodes 21. Therefore, the explanation of the term "adjacent" is not repeated herein. When a first conductive line 13 is disposed between two first conductive lines 13, the first conductive line 13 in the middle can be adjacent to the two other first conductive lines 13 respectively. The first interval PI indicates the smaller interval of the intervals between the middle first conductive line 13 and the two other first conductive lines 13. In some embodiments, the line width WA of the first conductive line 13 and the first interval P1 conform to the following formula:

$$WA/(WA+P1) \leq 30\%$$

In some embodiments, as shown in FIG. 3, the panel 1 may comprise second conductive lines 23 disposed between the second substrate 20 and the second insulation layer 22. In the normal direction Z of the first substrate 10, the sealant 40 at least partly overlaps the second conductive lines 23, for example. In some embodiments, the second conductive lines 23 can be electrically connected to the electronic component E2. In some embodiments, as shown in FIG. 2 and FIG. 3, the second electrode 21 may be electrically connected to the second conductive line 23 through the second via VH2. The second electrode 21 can be electrically connected to the electronic component E2 through the second conductive line 23, but it is not limited thereto. In some embodiments, the resistance of the second conductive line 23 may be less than or equal to the resistance of the second electrode 21 to reduce the impedance of the panel 1. In some embodiments, the second conductive line 23 may comprise metals, such as aluminum, molybdenum, titanium, gold, silver, copper, tin, nickel, alloys thereof, or any combination thereof. The first conductive line 13 and the second conductive line 23 may comprise the same or different materials. In some embodiments, the second insulation layer 22 may comprise oxides (such as silicon oxide), nitrides (such as silicon nitride), fluorides (such as tetrafluoroethylene, perfluorovinyl ether), or any combination thereof.

Figure 6:
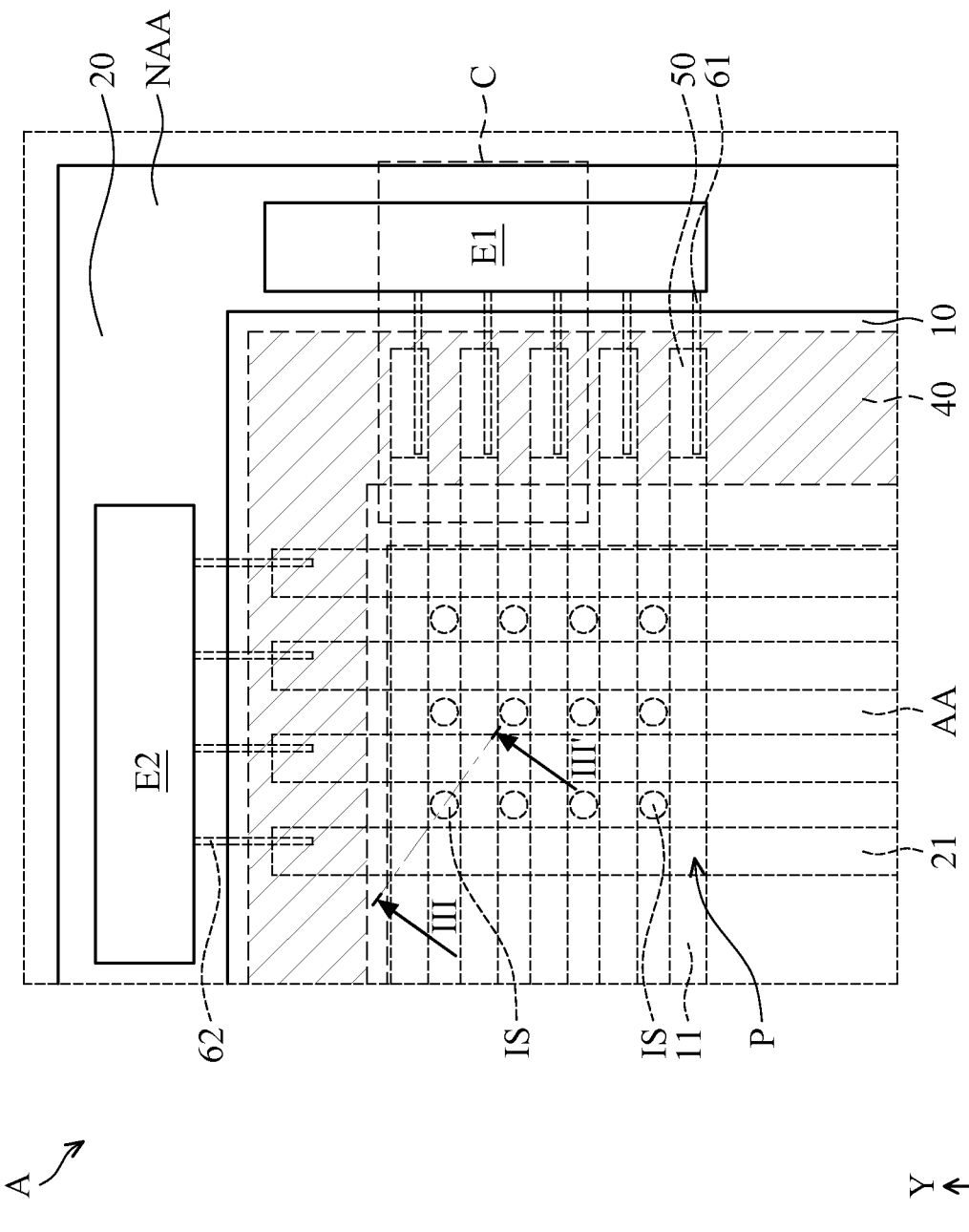
FIG. 6 is an enlarged schematic view of a region A in FIG. 1, according to other embodiment of the present disclosure.
Figure 7:
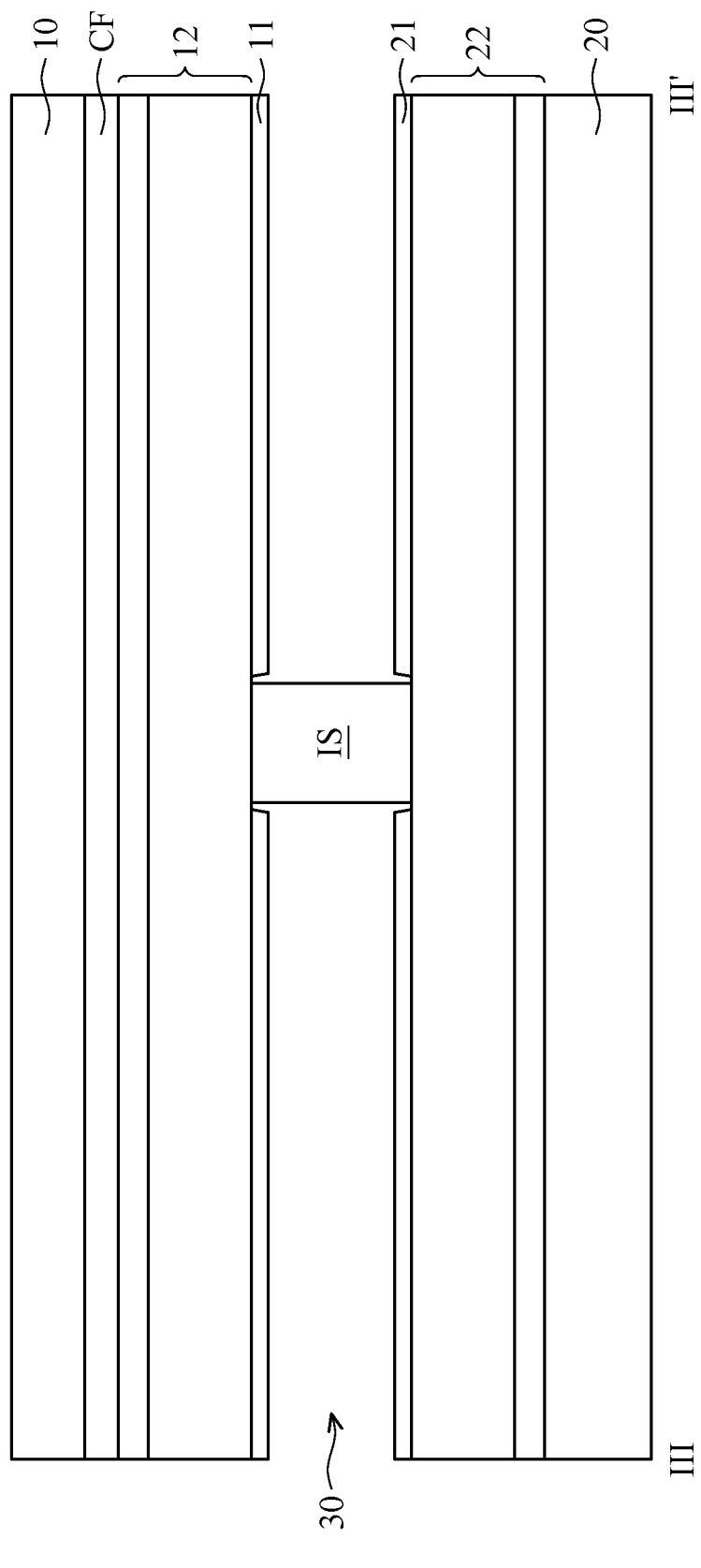
FIG. 7 is a cross-section schematic view of the panel of FIG. 6 taken along line according to an embodiment of the present disclosure.
Figure 8:
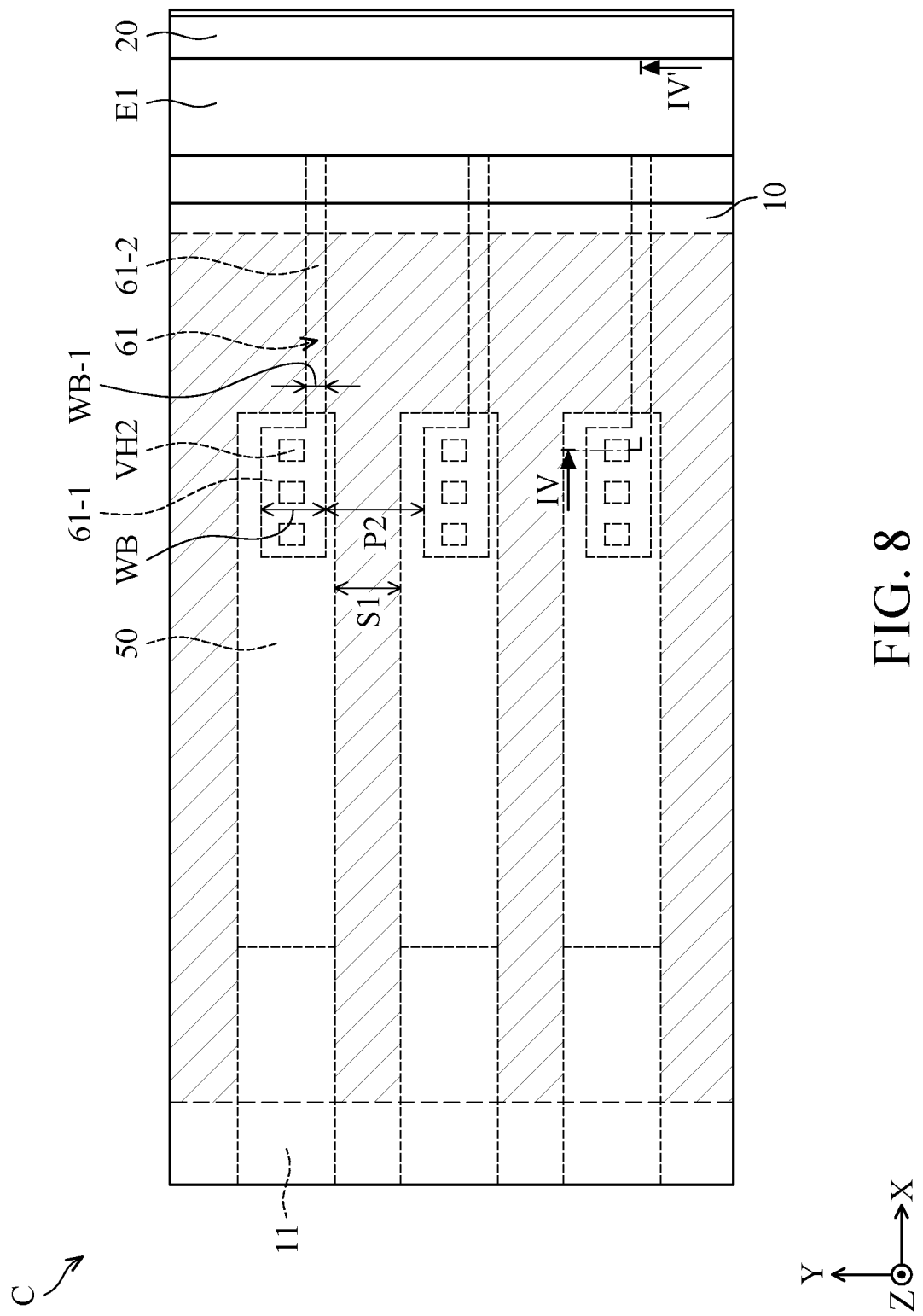
FIG. 8 is an enlarged schematic view of a region C in FIG. 6, according to an embodiment of the present disclosure.
Figure 9:
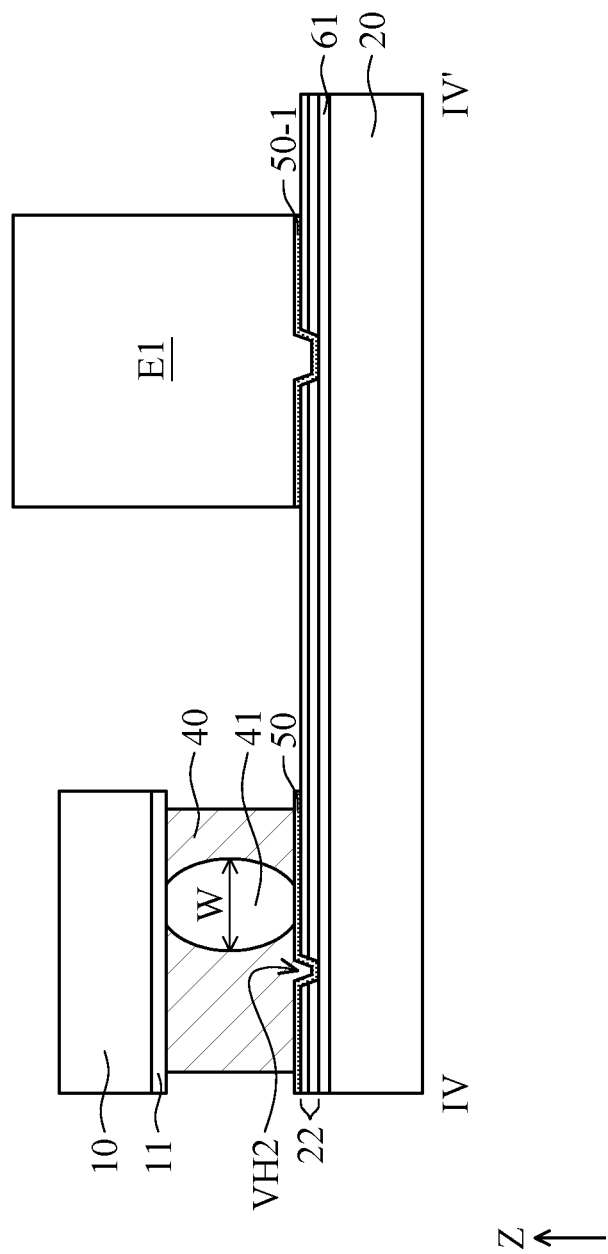
FIG. 9 is a cross-section schematic view of the panel of FIG. 8 taken along line IV-IV', according to an embodiment of the present disclosure.

FIG. 6 is an enlarged schematic view of a region A in the panel 1 of FIG. 1, according to other embodiment of the present disclosure. FIG. 7 is a cross-section schematic view of the panel 1 of FIG. 6 taken along line according to an embodiment of the present disclosure. FIG. 8 is an enlarged schematic view of a region C in FIG. 6, according to an embodiment of the present disclosure. FIG. 9 is a cross-section schematic view of the panel 1 of the electronic device taken along line IV-IV' in FIG. 8, according to an embodiment of the present disclosure. As shown in FIG. 1 and FIG. 6 to FIG. 9, the panel 1 of the electronic device of the present disclosure comprises a first substrate 10, a second substrate 20 opposite to the first substrate 10, a medium layer 30 disposed between the first substrate 10 and the second substrate 20, a sealant 40 disposed between the first substrate 10 and the second substrate 20 and surrounding the medium layer 30, a plurality of first electrodes 11 disposed between the first substrate 10 and the medium layer 30, a plurality of connecting lines 50 disposed between the second substrate 20 and the first electrodes 11, and a plurality of first transmission line 61 disposed between the second substrate 20 and the connecting lines 50. In this embodiment, the first conductive lines 13 may be optionally omitted from the panel 1. The second transmission lines 62 may, for example, replace the second conductive lines 23 to electrically connect the second electrodes 21 with the electronic component E2 disposed in the non-active area NAA. In some embodiments (not shown), the second electrode 21 may be electrically connected to the second transmission line 62 through at least one second via VH2. The second electrodes 21 may be electrically connected to the electronic component E2 through the second transmission line 62, but it is not limited thereto. In addition, as shown in FIG. 7, an optical layer CF may be optionally disposed between the first substrate 10 and the first insulation layer 12. The optical layer CF comprises, for example, a filter layer or other light-scattering material layers, but it is not limited thereto. In some embodiments, other insulation layers (such as organic materials or inorganic layers) can be optionally disposed between the optical layer CF and the first insulation layer 12.

As shown in FIG. 8, the plurality of first transmission lines 61 are disposed above the second substrate 20 and extend along the X direction. The plurality of first transmission lines 61 are arranged along the Y direction. The first transmission lines 61 are electrically connected to the electronic component E1. As shown in FIG. 9, the first transmission lines 61 may be electrically connected to the electronic component E1 through the other connecting lines 50-1, but it is not limited thereto. In some embodiments, the connecting line 50 and the other connecting line 50-1 may be material layers of the same material, but it is not limited thereto. In some embodiments, the connecting line 50 is, for example, the same material layer as the second conductive line 23, but it is not limited thereto. In some embodiments, a portion of the first transmission line 61 may be disposed between the sealant 40 (or the connecting line 50) and the second substrate 20. In some embodiments, as shown in FIG. 7, the panel 1 may comprise a second insulation layer 22 disposed above the second substrate 20 and between the second substrate 20 and the second electrodes 21. The second insulation layer 22 may comprise a single-layer or multi-layer structure. In some embodiments, as shown in FIG. 9, the second insulation layer 22 may be disposed between the second substrate 20 and the connecting line 50 (or the other connecting line 50-1). In some embodiments, as shown in FIG. 5, the second insulation layer 22 may be disposed between the connecting line 50 (and/or the other connecting line 50-1) and the first transmission line 61. In some embodiments, the second insulation layer 22 may have a plurality of second vias VH2. In some embodiments, as shown in FIG. 5, the connecting line 50 (and/or the other connecting line 50-1) at least partly overlaps the first transmission line 61, for example. The connecting lines 50 (and/or the other connecting lines 50-1) are electrically connected or contacted with the first transmission lines 61 through, for example, at least one second vias VH2.

In some embodiments, as shown in FIG. 8, the first transmission line 61 may comprise a first portion 61-1 and a second portion 61-2. The second portion 61-2 is connected to the first portion 61-1, and the second portion 61-2 is, for example, closer to the electronic component E1 than the first portion 61-1. In some embodiments, the first portion 61-1 overlaps the second vias VH2, for example. In some embodiments, in the normal direction Z of the first substrate 10, the first portion 61-1 (or a portion of the second portion 61-2) overlaps the sealant 40, for example. In some embodiments, the first portion 61-1 has a line width WB. In some embodiments, the line width WB may be in a range of 1 μm to 40 μm (1 μm≤WB≤40 μm). If the line width WB is too large (i.e. greater than 41 μm), the sealant 40 may be difficult to cure. In some embodiments, a line width WB-1 of the second portion 61-2 may be smaller than the line width WB of the first portion 61-1.

In some embodiments, there is a second interval P2 between two adjacent first transmission lines 61. The smallest space between the two adjacent first transmission lines 61 is defined as the second interval P2. When a first transmission line 61 is disposed between two other first transmission lines 61, the first transmission line 61 in the middle can be adjacent to the other two first transmission lines 61 respectively. The second interval P2 indicates the smaller interval of intervals between the middle first transmission line 61 and the other two first transmission lines 61. In some embodiments, the line width WB of the first transmission line 61 and the second interval P2 conform to the following formula:

$WB/P2 \leq 30\%$.

According to FIGS. 1 to 9, an embodiment of the present disclosure provides an electronic device comprising the panel 1. The panel 1 comprises a first substrate 10, a second substrate 20 opposite to the first substrate 10, a medium layer 30 disposed between the first substrate 10 and the second substrate 20, a sealant 40 disposed between the first substrate 10 and the second substrate 20 and surrounding the medium layer 30, a plurality of first electrodes 11 disposed between the first substrate 10 and the medium layer 30, and a plurality of connecting lines 50 disposed between the second substrate 20 and the plurality of first electrodes 11. The sealant 40 comprises a plurality of conductive particles 41. The plurality of first electrodes 11 is electrically connected to the plurality of connecting lines 50 via the plurality of conductive particles 41. There is a first space S1 between two adjacent connecting lines 50. One of the plurality of conductive particles has a width W, and the first space S1 and width W conform to the following formula:

$3 \leq S1/W \leq 20$.

By making sure that the panel 1 has the structure described above, the electronic components (e.g., the electronic component E1 and the electronic component E2) in the panel 1 can be concentrated, on the same substrate, for example, on the second substrate 20. Thus, the space usage efficiency of the first substrate 10 and/or second substrate 20 in the panel 1 can be improved, the borders of the first substrate 10 and/or second substrate 20 can be minimized, or the electronic device including the panel 1 can have a simpler bonding process. In some embodiments, the conductive particles 41 may, for example, have the property of moving in response to a magnetic field.

Figure 10:
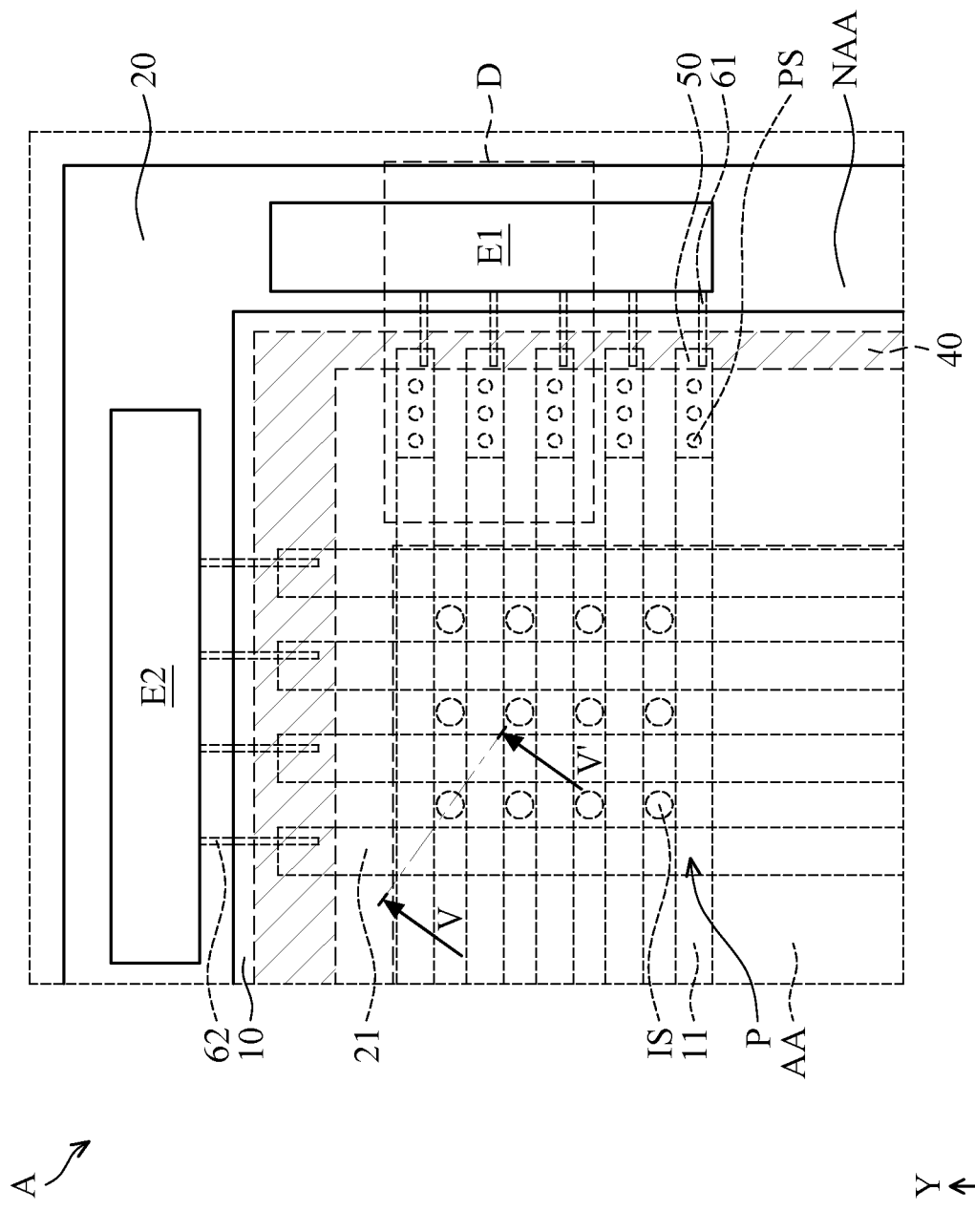
FIG. 10 is an enlarged schematic view of a region A in FIG. 1, according to other embodiment of the present disclosure.
Figure 11:
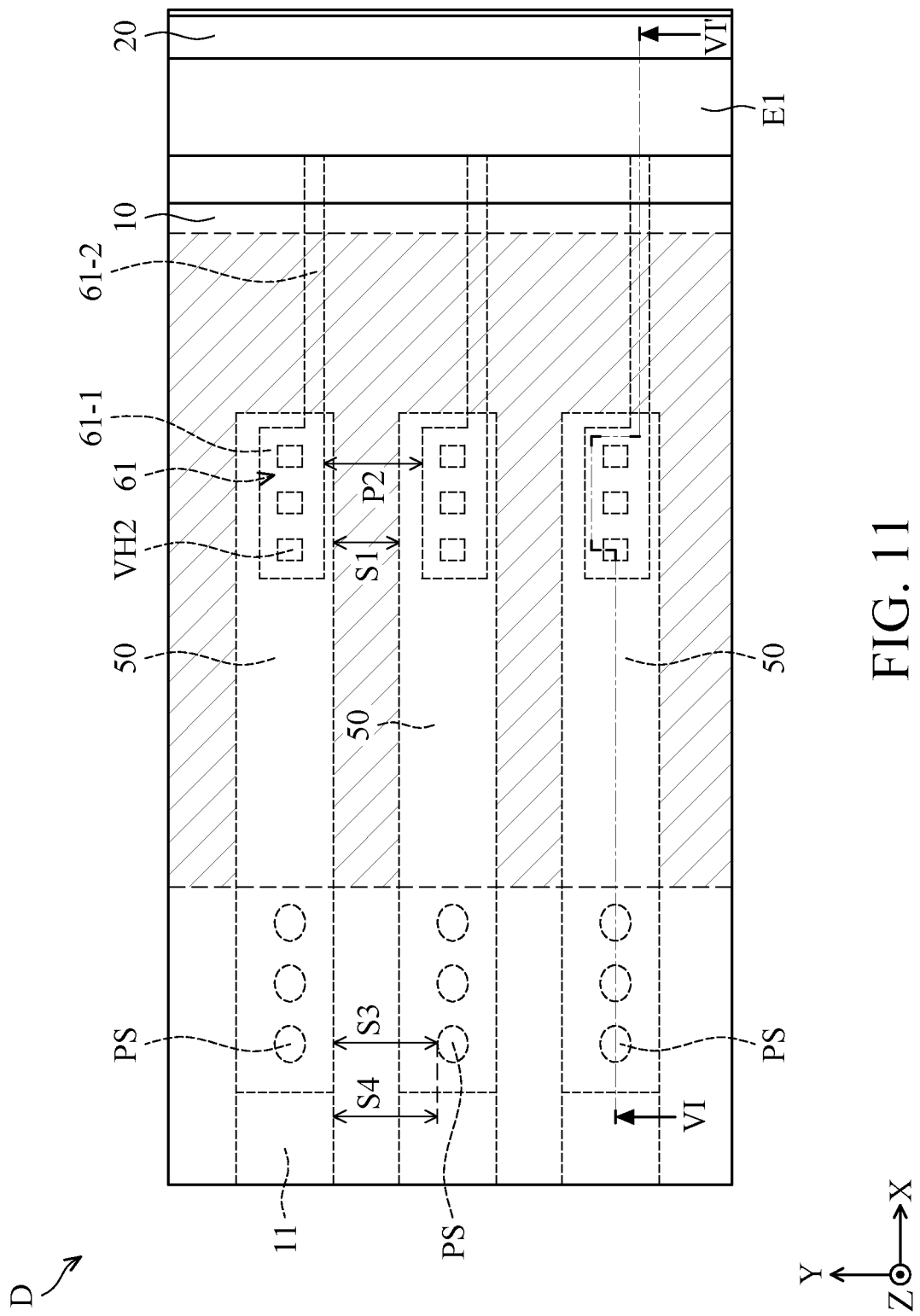
FIG. 11 is an enlarged schematic view of a region D in FIG. 10, according to an embodiment of the present disclosure.
Figure 12:
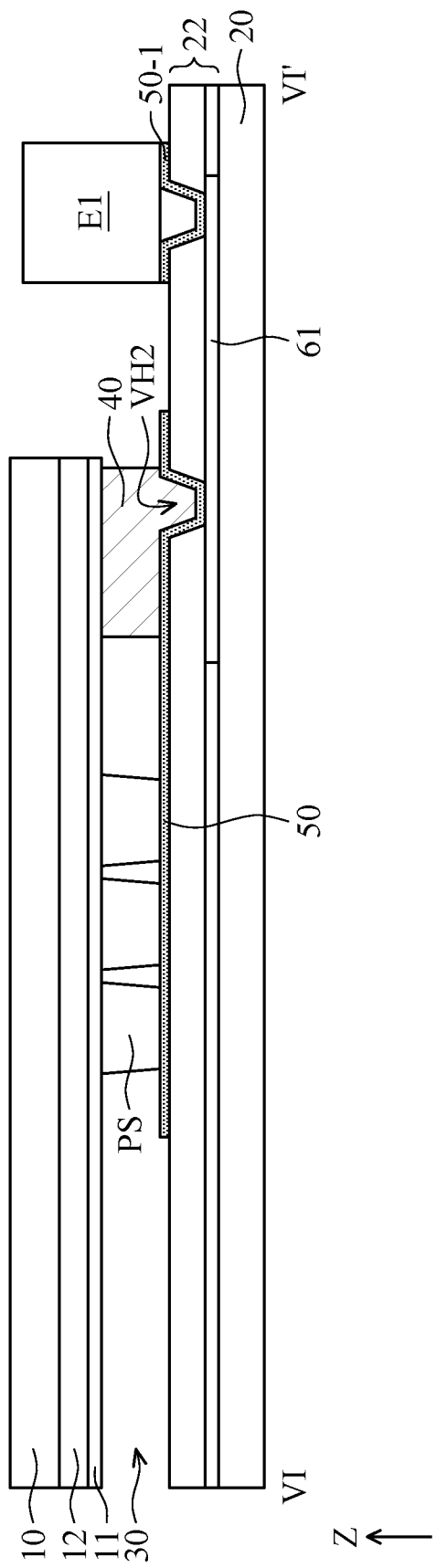
FIG. 12 is a cross-section schematic view of the panel of FIG. 10 taken along line VI-VI', according to an embodiment of the present disclosure.

FIG. 10 is an enlarged schematic view of a region A of the panel 1 of FIG. 1, according to other embodiment of the present disclosure. FIG. 11 is an enlarged schematic view of a region D in FIG. 10, according to an embodiment of the present disclosure. FIG. 12 is a cross-section schematic view of the panel 1 of an electronic device taken along line VI-VI' in FIG. 10, according to an embodiment of the present disclosure. In some embodiments, the sealant 40 may optionally not comprise the conductive particles 41. In some embodiments, the panel 1 may comprise at least one conductive spacer PS. The conductive spacer PS may be used to electrically connect the first electrode 11 to the connecting line 50, but it is not limited thereto. A plurality of conductive spacers PS are arranged, for example, along the X direction, which is, for example, substantially the same as, the extended direction of the connecting line 50, but it is not limited thereto. In other embodiments (not shown), the conductive spacers PS are arranged, for example, in an array or other suitable manner. It should be noted that the number of conductive spacers PS is illustrated as an example, the disclosure is not limited thereto. The structure of the panel and components shown in FIGS. 10 to 12 are substantially the same as that of the panel and components shown in FIGS. 6 to 9. A cross-section schematic view of the panel 1 of the electronic device taken along line V-V in FIG. 10, for example, may be substantially the same as that of FIG. 7. Therefore, the description is not repeated herein, and the conductive spacers PS are further described below.

In some embodiments, the conductive spacer PS comprises conductive materials. In some embodiments, the conductive spacer PS may comprise a spacer center and a conductive coating surrounding the spacer center, but it is not limited thereto. The spacer center may comprise conductive materials (e.g., metallic materials or other conductive materials) and/or insulation materials with support properties, such as photoresists or other materials having support properties, but it is not limited thereto. The conductive coating may comprise conductive materials, but it is not limited thereto. The conductive coating may be omitted in the embodiments that the spacer center comprises conductive materials.

In some embodiments, the panel 1 comprises the sealant 40 disposed between the first substrate 10 and the second substrate 20 and surrounding the medium layer 30. At least one conductive spacer PS may be disposed, for example, in a region surrounded by the sealant 40 (i.e. the active area AA). More specifically, the conductive spacer PS may be disposed in the active area AA, for example, as shown in FIG. 10 and FIG. 11, but it is not limited thereto. In some embodiments (not shown), the conductive spacer PS may be disposed in the sealant 40. That is, in the normal direction Z of the first substrate 10, the conductive spacer PS may overlap the sealant 40, for example. In some embodiments (not shown), the conductive spacer PS may be disposed outside the sealant 40 and the conductive spacer PS may be disposed in the non-active area NAA. The influence of moisture and oxygen on the conductive spacer PS may be reduced by disposing the conductive spacer PS in the sealant 40 and the active area AA, and the reliability of the panel 1 can be improved, but it is not limited thereto.

In some embodiments, as shown in FIG. 12, the at least one conductive spacer PS may be disposed between the first electrode 11 and the connecting line 50. The at least one conductive spacer PS may be electrically connected to a connecting first electrode 11 and the first connecting line 50. In particular, as shown in FIG. 12, the plurality of first electrodes comprise the connecting first electrode and an adjacent first electrode. The first electrode 11 electrically connected to the conductive spacer PS is defined as the connecting first electrode 11 below. The first electrode 11 adjacent to the connecting first electrode 11 is defined as the adjacent first electrode. The connecting first electrode 11 electrically connected to the conductive spacer PS here can be an adjacent first electrode 11 for another conductive spacer PS, and the adjacent first electrode 11 here can be a connecting first electrode 11 electrically connected to the other conductive spacer PS, as shown in FIG. 11. In particular, as shown in FIG. 12, the plurality of connecting lines comprise a first connecting line and a second connecting line. The second connecting line is adjacent to the first connecting line. The connecting line 50 electrically connected to the conductive spacer PS is defined as the first connecting line below. The connecting line adjacent to the first connecting line is defined as the second connecting line. Here, the first connecting line electrically connected to the conductive spacer PS can be a second connecting line for another conductive spacer PS, and the second connecting line here can be a first connecting line electrically connected to the other conductive spacer PS, as shown in FIG. 11. In some embodiments, the second connecting line is adjacent to the first connecting line. There is a third space S3 between the at least one conductive spacer PS and the second connecting line. When the first connecting line is set between two second connecting lines, the first connecting line is adjacent to the two second connecting lines respectively. The third space S3 indicates the smaller space of the spaces between the at least one conductive spacer PS and the two second connecting lines. In some embodiments, the third space S3 is greater than or equal to 3 μm and less than or equal to 50 μm, but not limited thereto. In some embodiments, the third space S3 is greater than or equal to 5 μm and less than or equal to 50 μm, but it is not limited thereto.

In some embodiments, the adjacent first electrode is adjacent to the connecting first electrode. The at least one conductive spacer PS is separated from the adjacent first electrode by a fourth space S4. When the connecting first electrode 11 is disposed between the two adjacent first electrodes 11, the connecting first electrode 11 is adjacent to the two adjacent first electrodes 11. The fourth space S4 indicates the smaller space of the spaces between the at least one conductive spacer PS and the two adjacent first electrodes 11. In some embodiments, the fourth space S4 is greater than or equal to 3 μm and less than or equal to 50 μm, but it is not limited thereto. In some embodiments, the fourth space S4 is greater than or equal to 5 μm and less than or equal to 50 μm, but it is not limited thereto.

In some embodiments, as shown in FIG. 11, the first transmission line 61 may be electrically connected to the electronic component E1. As shown in FIG. 12, the connecting line 50 may be electrically connected to the first transmission line 61 through the at least one second via VH2 of the second insulation layer 22. In some embodiments, the first electrode 11 may be electrically connected to the electronic component E1 through the at least one conductive spacer PS, the connecting line 50, and the first transmission line 61. In this way, the electronic components (e.g., the electronic component E1 and the electronic component E2) in the panel 1 can be concentrated, for example, on the same substrate, for example, on the second substrate 20. Thus, the space usage efficiency of the first substrate 10 and/or the second substrate 20 in the panel 1 can be improved, the borders of the first substrate 10 and/or the second substrate 20 can be minimized, or the electronic device including the panel 1 can have a simpler bonding process.

According to FIGS. 1 and 10-12, an embodiment of the present disclosure provides an electronic device comprising the panel 1. The panel 1 comprises a first substrate 10, a second substrate 20 opposite to the first substrate 10, a medium layer 30 disposed between the first substrate 10 and the second substrate 20, a plurality of first electrodes 11 disposed between the first substrate 10 and the medium layer 30, a plurality of connecting lines 50 disposed between the second substrate 20 and the first electrodes 11, and at least one conductive spacer PS. The first electrodes 11 comprise a connecting first electrode and an adjacent first electrode. The connecting lines 50 comprise a first connecting line and a second connecting line. The at least one conductive spacer PS is electrically connected to one of the first electrodes 11 (e.g. the connecting first electrode) and one of the connecting lines (e.g. the first connecting line). The second connecting line is adjacent to the first connecting line. The at least one conductive spacer PS is separated from the second connecting line by a third space S3. The third space S3 is greater than or equal to 3 μm and less than or equal to 50 μm, but it is not limited thereto. In some embodiments, the adjacent first electrode is adjacent to the connecting first electrode. The at least one conductive spacer PS is separated from the adjacent first electrode by a fourth space S4. In some embodiments, the fourth space S4 is, for example, greater than or equal to 3 μm and less than or equal to 50 μm, but it is not limited thereto.

Figure 13:
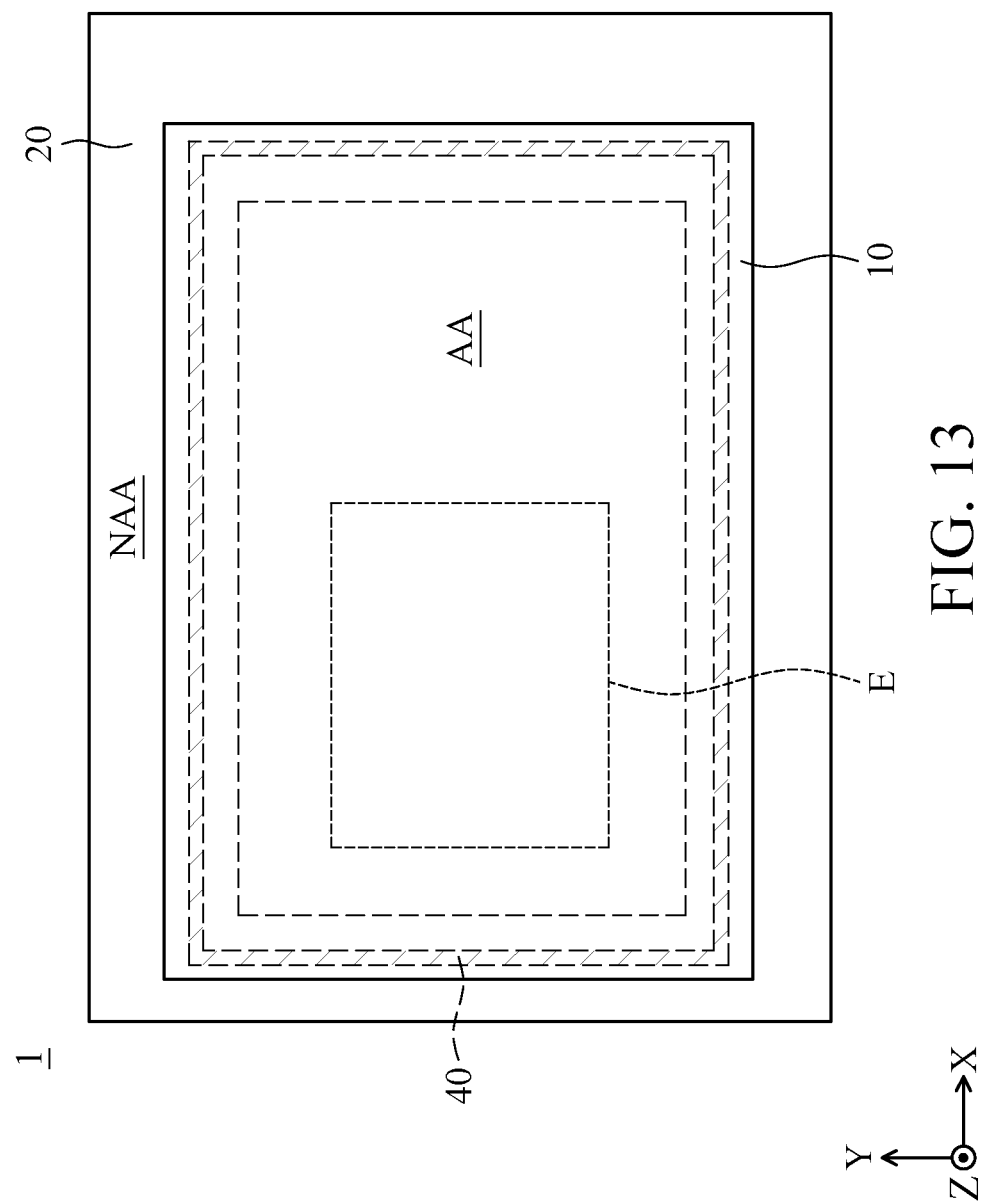
FIG. 13 is a top schematic view of a panel of an electronic device according to other embodiment of the present disclosure.
Figure 14:
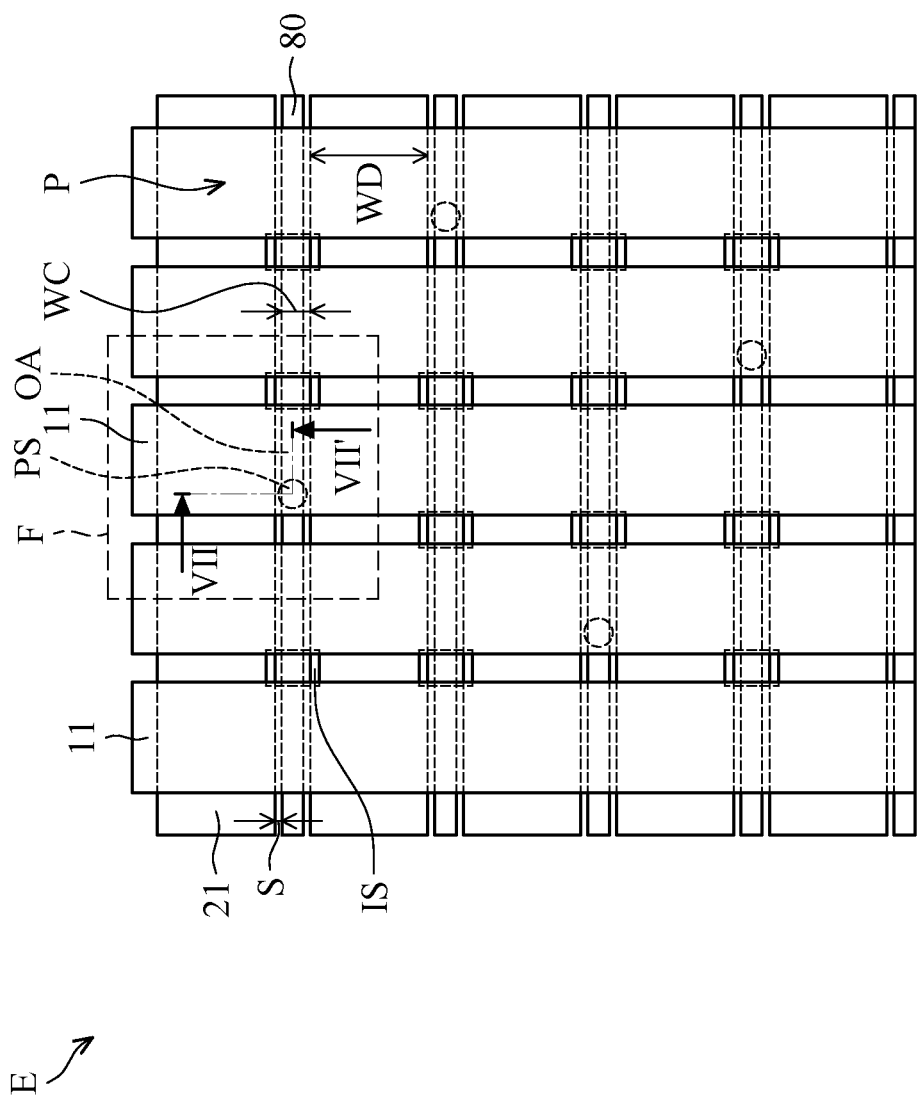
FIG. 14 is an enlarged schematic view of a region E in FIG. 13, according to an embodiment of the present disclosure.
Figure 15:
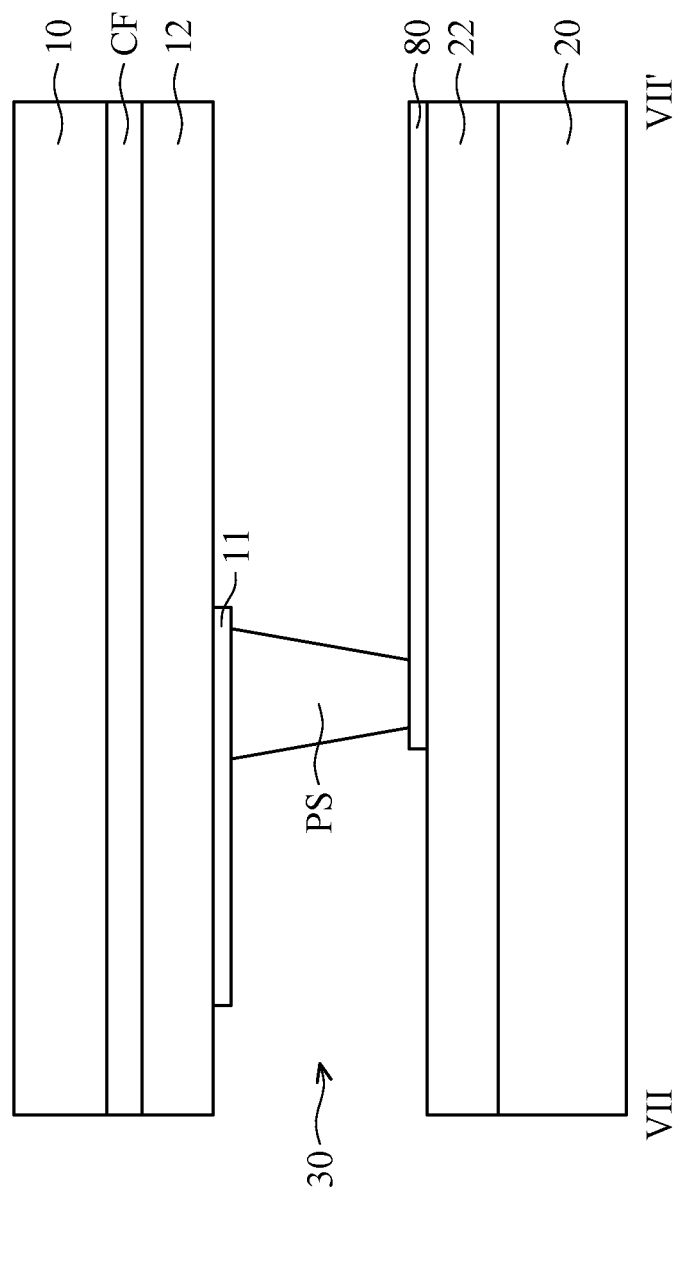
FIG. 15 is a cross-section schematic view of the panel of FIG. 14 taken along line VII-VII', according to an embodiment of the present disclosure.
Figure 16:
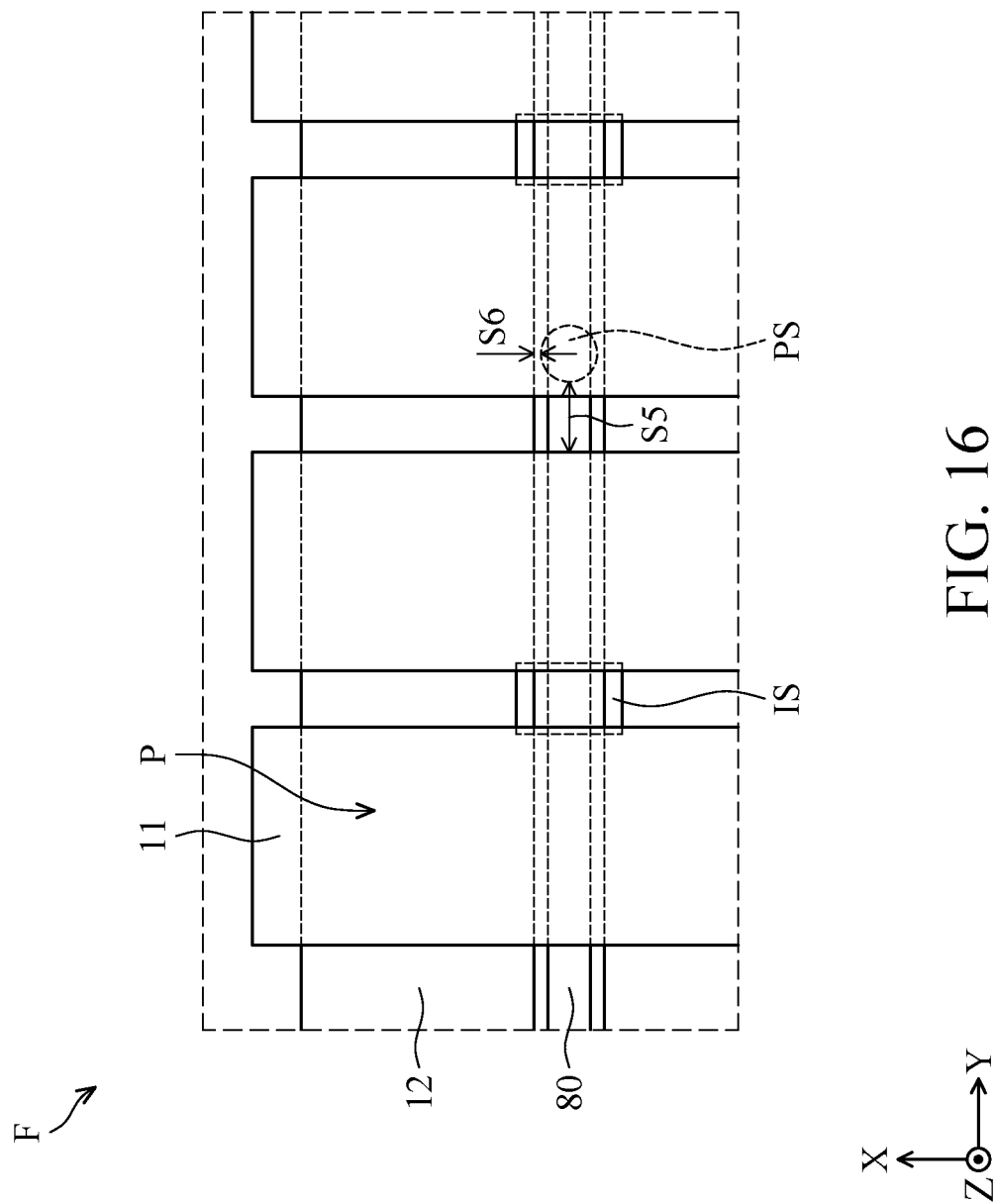
FIG. 16 is an enlarged schematic view of a region F in FIG. 14, according to an embodiment of the present disclosure.

An aspect of the conductive spacer PS disposed in the active area AA will be disclosed below in conjunction with FIGS. 13 to 16. FIG. 13 is a top schematic view of a panel of an electronic device according to other embodiment of the present disclosure. FIG. 14 is an enlarged schematic view of a region E in FIG. 13, according to an embodiment of the present disclosure. FIG. 15 is a cross-section schematic view of the panel of FIG. 14 taken along line VII-VII', according to an embodiment of the present disclosure. FIG. 16 is an enlarged schematic view of a region F in FIG. 14, according to an embodiment of the present disclosure. In addition to conductive spacers PS disposed in the active area AA, the panel 1 comprises conductive connecting lines 80 extending along substantially the same direction as that of the second electrodes 21 and intersected with the first electrodes 11. The plurality of conductive connecting lines 80 may be disposed in the active area AA and arranged along the X direction, for example. In particular, in the X direction, the plurality of conductive connecting lines 80 and the plurality of second electrodes 21 are disposed and arranged alternately, for example. In other words, for example, a conductive connecting line 80 may be disposed between two adjacent second electrodes 21, or the two second electrodes 21 may be disposed between two adjacent conductive connecting lines 80. In the normal direction Z of the first substrate 10, for example, the conductive connecting lines 80 do not overlap the second electrodes 21. In the normal direction Z of the first substrate 10, for example, the conductive connecting line 80 and the second electrode 21 are separated by a space S. The conductive connecting lines 80 are disposed between two adjacent second electrodes 21 and are insulated with the second electrodes 21. Therefore, the conductive connecting lines 80 and the second electrodes 21 are used to transmit different signals.

In some embodiments, in the X direction, a width WC of the conductive connecting line 80 is, for example, less than or equal to a width WD of the second electrode 21. The above-mentioned width is, for example, an average width of the component in the direction perpendicular to the extending direction thereof. The structures of the panel and the components shown in FIGS. 13 to 16 are substantially the same as the structures of the panel and the components shown in FIGS. 10 to 12. Therefore, the description is not repeated herein, and the conductive connecting lines 80 and the conductive spacers PS are further described below.

In some embodiments, as shown in FIG. 14 and FIG. 15, the conductive connecting lines 80 are disposed above the second substrate 20 and extend along the Y direction. More specifically, the conductive connecting lines 80 may be disposed between the second insulation layer 22 and the medium layer 30. In some embodiments (not shown), the conductive connecting lines 80 and the second electrodes 21 are both disposed between the second substrate 20 and the medium layer 30. The conductive connecting lines 80 and the second electrodes 21 are, for example, different layer materials. In some embodiments, an impedance of the conductive connecting line 80 is, for example, less than or equal to an impedance of the second electrode 21. In some embodiments, the conductive connecting lines 80 may comprise metals such as, aluminum, molybdenum, titanium, gold, silver, copper, tin, nickel, alloys thereof, or any combination thereof, but it is not limited thereto. In some embodiments, the spacer IS (non-conductive spacers) and the conductive spacer PS may be disposed in the active area AA (i.e. in the region surrounded by the sealant 40). In some embodiments, in the normal direction Z of the first substrate 10, the spacer IS and the conductive spacer PS may, for example, do not overlap with each other. In some embodiments, in the normal direction Z of the first substrate 10, the size or shape of the outline of the spacer IS and the outline of the conductive spacer PS may be different or the same. In some embodiments, the region where the second electrodes 21 overlap the first electrodes 11 can be defined as a pixel area P. In some embodiments, in the normal direction Z of the first substrate 10, the spacer IS does not overlap the pixel area P, for example. In some embodiments, in the normal direction Z of the first substrate 10, the conductive spacer PS overlaps, for example, a region OA. The region OA is where the first electrodes 11 and the conductive connecting lines 80 overlapped. In some embodiments, in the normal direction Z of the first substrate 10, a portion of the conductive spacer PS, for example, does not overlap the conductive connecting line 80. That is, the portion of the conductive spacer PS, for example, protrudes from the conductive connecting line 80, but it is not limited thereto.

In some embodiments, the plurality of first electrodes 11 are disposed between the first substrate 10 and the medium layer 30. The plurality of first electrodes 11 comprise a connecting first electrode and an adjacent first electrode. In some embodiments, the plurality of conductive connecting lines 80 are disposed between the second substrate 20 and the plurality of first electrodes 11. In some embodiments, the at least one conductive spacer PS is disposed between the first substrate 10 and the second substrate 20. In some embodiments, the at least one conductive spacer PS is disposed between the first electrode 11 and the conductive connecting line 80. In some embodiments, the at least one conductive spacer PS is electrically connected to the connecting first electrode 11 and one of the plurality of the conductive connecting lines 80, as shown in FIG. 15. In some embodiments, in the normal direction Z of the first substrate 10, the at least one conductive spacer PS overlaps the first electrode 11 and the conductive connecting line 80. The adjacent first electrode 11 is adjacent to the connecting first electrode 11. The first electrode 11 electrically connected to the conductive spacer PS is defined as the connecting first electrode 11. The first electrode 11 adjacent to the connecting first electrode 11 is defined as the adjacent first electrode 11. The connecting first electrode 11 electrically connected to the conductive spacer PS here can be an adjacent first electrode 11 for another conductive spacer PS, and the adjacent first electrode 11 here can be a connecting first electrode 11 electrically connected to the other conductive spacer PS, as shown in FIG. 11. In some embodiments, in the normal direction Z of the first substrate 10, the at least one conductive spacer is separated from the adjacent first electrode 11 by a fifth space S5. When the connecting first electrode 11 is disposed between the two adjacent first electrodes 11, the connecting first electrode 11 in the middle is adjacent to the two adjacent first electrodes 11 respectively. The fifth space S5 indicates the smaller space of the spaces between the conductive spacer PS and the two adjacent first electrodes 11, as shown in FIG. 16. In some embodiments, the fifth space S5 is greater than or equal to 3 μm and less than or equal to 50 μm, but it is not limited thereto. In some embodiments, the fifth space S5 is greater than or equal to 5 μm and less than or equal to 50 μm, but it is not limited thereto.

In some embodiments, in the normal direction Z of the first substrate 10, the conductive spacer PS and the adjacent second electrode 21 are separated by a sixth space S6. When the conductive spacer PS is disposed between two of the second electrodes 21, the conductive spacer PS is adjacent to the two second electrodes 21. The sixth space S6 indicates the smaller space of the spaces between the conductive spacer PS and the two second electrodes 21, as shown in FIG. 16. In some embodiments, the sixth space S6 is greater than or equal to 3 μm and less than or equal to 50 μm, but it is not limited thereto. In some embodiments, the sixth space S6 is greater than or equal to 5 μm and less than or equal to 50 μm, but it is not limited thereto.

According to FIGS. 13-16, an embodiment of the present disclosure provides an electronic device comprising the panel 1. The panel 1 comprises a first substrate 10, a second substrate 20 opposite to the first substrate 10, a medium layer 30 disposed between the first substrate 10 and the second substrate 20, a plurality of first electrodes 11 disposed between the first substrate 10 and the medium layer 30, a plurality of conductive connecting lines 80 disposed between the second substrate 20 and the first electrodes 11, and at least one conductive spacer PS. The first electrodes 11 comprise a connecting first electrode and an adjacent first electrode. The conductive spacer PS is electrically connected with the connecting first electrode and one of the conductive connecting lines. The conductive spacer PS is separated from the adjacent first electrode by a fifth space S5. The fifth space S5 is greater than or equal to 3 μm and less than or equal to 50 μm, but it is not limited thereto.

By making sure that the panel 1 has the structure described above, the electronic components in the panel 1 can be concentrated on the same substrate, such as the second substrate 20. Thus, the space usage efficiency of the first substrate 10 and/or the second substrate 20 in the panel 1 can be improved, the borders of the first substrate 10 and/or the second substrate 20 can be minimized, or the electronic device including the panel 1 can have a simpler bonding process. Furthermore, the influence of moisture and oxygen on the conductive spacer PS may be reduced, and the reliability of the panel 1 can be improved thereby.

Although aspects of the sealant 40 in the panel 1 comprising the conductive particles 41 and the panel 1 comprising the conductive spacer PS are illustrated in different embodiments, it will be understood by one of ordinary skill in the art that, after referring to the above content, the panel 1 may comprise the conductive spacer PS and the sealant 40 comprising the conductive particles 41 at the same time.

Figure 17:
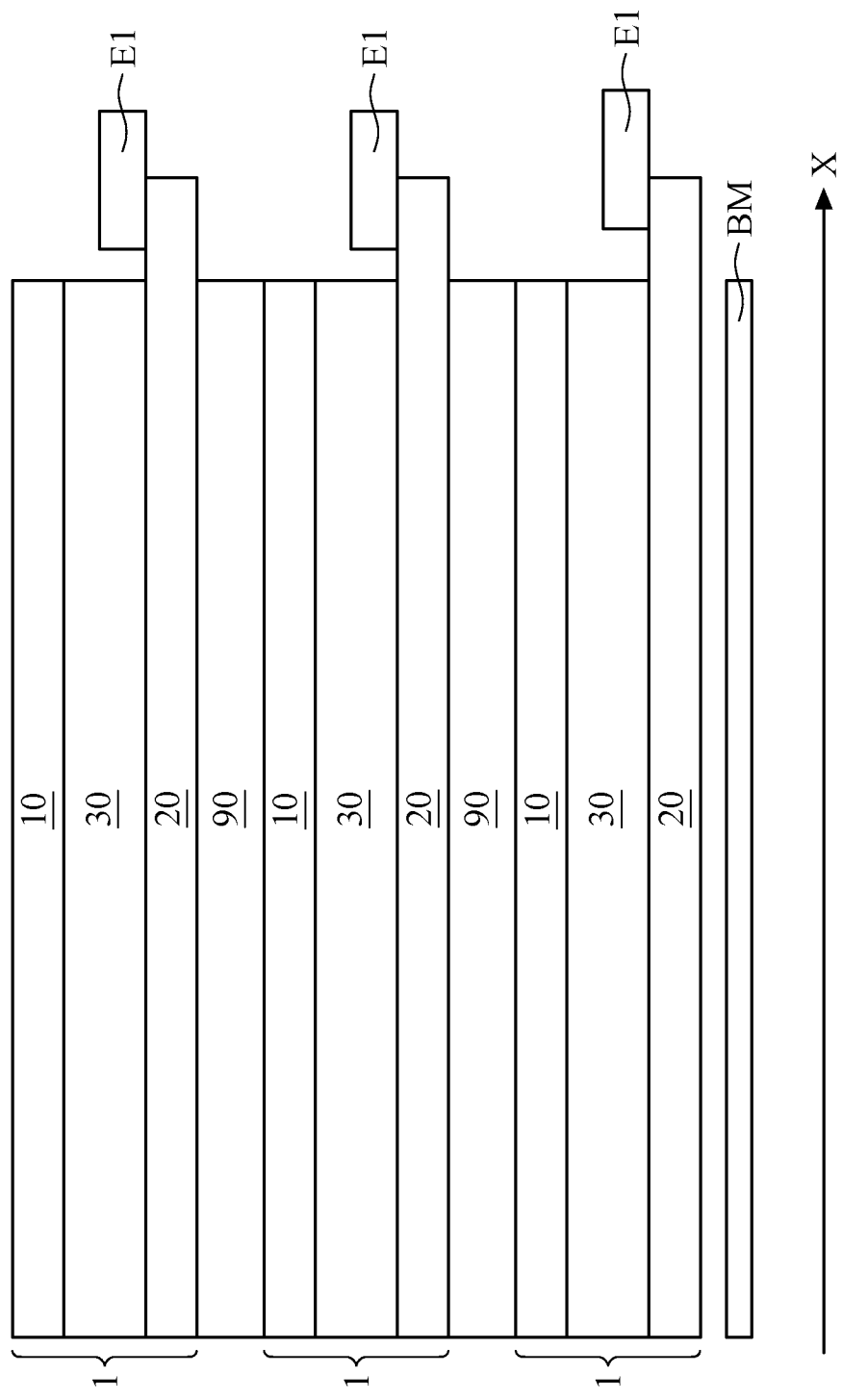
FIG. 17 is a cross-section schematic view of the electronic device of FIG. 1 taken along X-axis, according to an embodiment of the present disclosure.
Figure 18:
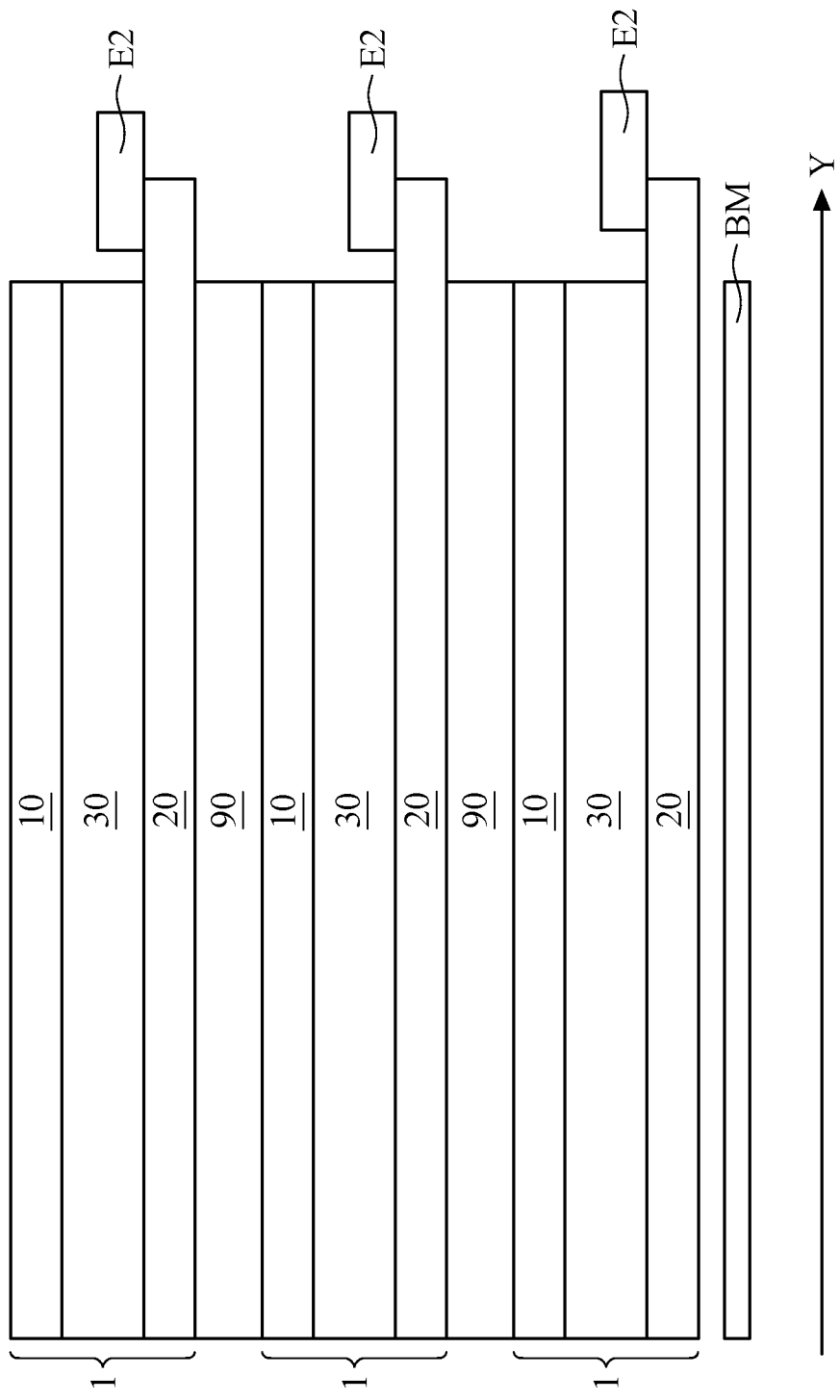
FIG. 18 is a cross-section schematic view of the electronic device of FIG. 1 taken along Y-axis, according to an embodiment of the present disclosure.

In some embodiments, the electronic device may comprise a plurality of panels 1. An aspect of the electronic device comprising a plurality of panels 1 will be disclosed below in conjunction with FIGS. 1, 17, and 18. FIG. 17 is a cross-section schematic view of the electronic device taken along X-axis in FIG. 1, according to an embodiment of the present disclosure. FIG. 18 is a cross-section schematic view of the electronic device taken along Y-axis in FIG. 1, according to an embodiment of the present disclosure. It can be seen from FIG. 17 and FIG. 18 that in an embodiment, the electronic device of the present disclosure may comprise a plurality of panels 1 (including the first substrate 10, the second substrate 20 and the medium layer 30), an adhesion layer 90 and an absorbent material layer BM, but it is not limited thereto. The medium layer 30 of the panel 1 comprise, for example, liquid crystals (such as cholesteric liquid crystals, but it is not limited thereto) that can reflect different colors, such as blue, green and red light, but it is not limited thereto. In other embodiments, for example, the medium layers 30 of these panels 1 reflect different colors according to requirements. In other embodiments, the number of the panels 1 comprised in the electronic device can be adjusted according to requirements. In some embodiments, the adhesion layer 90 may comprise optical acrylic glues (OCA), optical glues, transparent glues, light-curable glues, moisture-curable glues, other suitable glue, or combinations thereof, but it is not limited thereto. In some embodiments, the absorbent material layer BM may comprise black resists, black plastics, black pigments, or a combination thereof, but it is not limited thereto. In some embodiments (not shown), the absorbent material layer BM, for example, can be disposed in the panel 1 in the bottommost according to requirements.

In some embodiments (not shown), the bottommost panel 1 can be bonded to the absorbent material layer BM through the adhesion layer 90. In some embodiments, the structure of each of the panels 1 may be the same or different from each other. For example, the plurality of panels 1 may comprise panels having the structures as shown in FIGS. 2 to 5, panels having the structures as shown in FIGS. 6 to 9, panels having the structures as shown in FIGS. 10-12, panels having the structures as shown in FIGS. 13-16, or any combination thereof. In some embodiments, the electronic component E1 and/or electronic component E2 comprised in each of the panels 1 may be the same or different from each other.

The electronic device with the above structure can have a simplified manufacturing process, a higher resolution, or improved panel reliability.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An electronic device, comprising:
   a panel, comprising;
   a first substrate;
   a second substrate opposite the first substrate;
   a medium layer disposed between the first substrate and the second substrate;
   a sealant disposed between the first substrate and the second substrate and surrounding the medium layer;
   a plurality of first electrodes disposed between the first substrate and the medium layer;
   a plurality of first conductive lines disposed between the first substrate and the plurality of first electrodes; and
   a plurality of connecting lines disposed between the second substrate and the plurality of first electrodes,
   wherein the sealant comprises a plurality of conductive particles, the plurality of first electrodes are electrically connected to the plurality of connecting lines via the plurality of conductive particles, a first space S1 is between two adjacent connecting lines among the plurality of connecting lines, one of the conductive particles has a width W, and the first space S1 and width W conform to the following formula:

$$3 \leq S1/W \leq 20,$$

wherein each of the first conductive lines comprises an opening that overlaps the sealant.

2. The electronic device as claimed in claim 1, wherein a second space S2 is between two adjacent first electrodes among the plurality of first electrodes, and the second space S2 and the width W conform to the following formula:

$$3 \leq S2/W \leq 20.$$

3. The electronic device as claimed in claim 1, wherein the sealant comprises the plurality of conductive particles in a volume percentage of A %, and the volume percentage, the first space S1, and the width W conform to the following formula:

$$A \times 4 \times W \leq S1.$$

4. The electronic device as claimed in claim 1, wherein a second space S2 is between two adjacent first electrodes among the plurality of first electrodes, the sealant comprises the plurality of conductive particles in a volume percentage of A %, and the volume percentage, the second space S2, and the width W conform to the following formula:

$$A \times 4 \times W \leq S2.$$

5. The electronic device as claimed in claim 1, wherein the plurality of first conductive lines are electrically connected to the first electrodes, and resistance of the first conductive lines is less than or equal to resistance of the first electrodes.

6. The electronic device as claimed in claim 5, wherein a first interval P1 is between two adjacent first conductive lines among the plurality of first conductive lines, and a line width WA of one of the first conductive line and the first interval P1 conform to the following formula:

$$WA/(WA+P1) \leq 30\% \ WA/WA+P1 \leq 30\%.$$

7. The electronic device as claimed in claim 1, wherein the opening is disposed in a second portion of each of the first conductive lines, and a line width of a portion of the second portion which corresponds to the opening is less than 20 μm.

8. The electronic device as claimed in claim 7, wherein each of the first conductive lines comprises a first portion that is connected to the second portion and that overlaps the sealant, and a line width of the first portion is less than 40 μm.

9. The electronic device as claimed in claim 7, wherein a first interval P1 is between two adjacent first conductive lines among the first conductive lines, and the line width WA of the first portion and the first interval P1 conform to the following formula:

$$WA/(WA+P1) \leq 30\%.$$

* * * * *